(12) United States Patent
Damveld et al.

(10) Patent No.: US 12,175,015 B2
(45) Date of Patent: Dec. 24, 2024

(54) ADJUSTING IMAGE CONTENT TO IMPROVE USER EXPERIENCE

(71) Applicant: APPLE INC., Cupertino, CA (US)

(72) Inventors: Hermannus J. Damveld, Santa Clara, CA (US); Grant H. Mulliken, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/103,512

(22) Filed: Jan. 31, 2023

(65) Prior Publication Data

US 2023/0288985 A1    Sep. 14, 2023

Related U.S. Application Data

(63) Continuation of application No. PCT/US2021/044145, filed on Aug. 2, 2021.

(60) Provisional application No. 63/060,338, filed on Aug. 3, 2020.

(51) Int. Cl.
*G06F 3/01* (2006.01)
*G09G 3/00* (2006.01)

(52) U.S. Cl.
CPC .............. *G06F 3/013* (2013.01); *G09G 3/001* (2013.01); *G09G 2320/066* (2013.01); *G09G 2354/00* (2013.01)

(58) Field of Classification Search
CPC ........... G09G 3/001; G09G 3/20–2007; G09G 2320/06; G09G 2320/0613; G09G 2320/062; G09G 2320/066–0686; G09G 2320/10–106; G09G 2354/00; G06F 3/002; G06F 3/005; G06F 3/011–013; G06F 3/0481; G06F 3/04815; G06F 3/04845; G06F 2203/04801; G06F 2203/04803; G02B 27/01; G02B 2027/0138; G02B 2027/0141; G02B 2027/0179; G02B 2027/0187

See application file for complete search history.

(56) References Cited

U.S. PATENT DOCUMENTS

| | | | |
|---|---|---|---|
| 5,471,568 A | * | 11/1995 | Webb .................. G06T 11/40 382/199 |
| 9,645,395 B2 | * | 5/2017 | Bolas ................ G02B 27/0093 |
| 9,999,835 B2 | | 6/2018 | Watson |
| 10,181,212 B2 | | 1/2019 | Herman et al. |
| 10,255,715 B2 | | 4/2019 | Mallinson |
| 10,373,592 B2 | | 8/2019 | Tall et al. |

(Continued)

OTHER PUBLICATIONS (PCT) European Patent Office (ISA/EP), International Search Report and Written Opinion of the International Searching Authority, International Application No. PCT/US2021/044145, 18 pages, Jan. 10, 2022.

*Primary Examiner* — Nathan Danielsen
(74) *Attorney, Agent, or Firm* — Thompson Hine LLP

(57) ABSTRACT

Various implementations disclosed herein include devices, systems, and methods that adjust image content to reduce motion sickness during an experience. For example, an example process may include determining a first zone and a second zone of a display, generating images of a three-dimensional (3D) environment, identifying image content of each of the images corresponding to the second zone of the display, and reducing at least one of contrast or spatial frequency of the image content of each of the images corresponding to the second zone of the display.

19 Claims, 15 Drawing Sheets

(56) References Cited

U.S. PATENT DOCUMENTS

| | | | |
|---|---|---|---|
| 2006/0271612 A1* | 11/2006 | Ritter | H04N 19/136 375/E7.161 |
| 2017/0277256 A1* | 9/2017 | Burns | G06F 3/013 |
| 2017/0285736 A1 | 10/2017 | Young et al. | |
| 2017/0287112 A1 | 10/2017 | Stafford et al. | |
| 2018/0261003 A1 | 9/2018 | Peli | |
| 2018/0350032 A1 | 12/2018 | Bastani et al. | |
| 2018/0357752 A1* | 12/2018 | Ho | G06F 3/147 |
| 2019/0355292 A1* | 11/2019 | Morin | G09G 3/20 |

\* cited by examiner

ADJUSTING IMAGE CONTENT TO IMPROVE USER EXPERIENCE

CROSS-REFERENCE TO RELATED APPLICATIONS

This patent application is a continuation of International Application No. PCT/US2021/044145 filed on Aug. 2, 2021, entitled "ADJUSTING IMAGE CONTENT TO IMPROVE USER EXPERIENCE," which claims the benefit of U.S. Provisional Application No. 63/060,338 filed on Aug. 3, 2020, entitled "ADJUSTING CONTENT TO IMPROVE USER EXPERIENCE," each of which is incorporated herein by this reference in its entirety.

TECHNICAL FIELD

The present disclosure generally relates to displaying content with electronic devices, and in particular, to systems, methods, and devices to adjust content to improve user experience.

BACKGROUND

Electronic devices are often used to present users with virtual objects that either complement or replace surrounding physical environments that are perceivable in views provided by such electronic devices. In some circumstances, users may experience motion sickness during such experiences.

SUMMARY

Various implementations disclosed herein include devices, systems, and methods that adjust image content to reduce motion sickness or otherwise improve a user experience. Some implementations adjust content outside of a foveated gaze zone (FGZ) also referred to herein as the extrafoveal zone (e.g., peripheral and parafoveal zones), to reduce motion sickness during an experience (e.g., visual and/or auditory content that could include a real-world physical environment, virtual content, or a combination of each). In some implementations, unlike prior techniques that blacked out content outside the FGZ, the techniques adjust (e.g., reduce) contrast or spatial frequency of content outside the FGZ. This may reduce motion sickness without significantly detracting from the user experience in the way that blacking out content detracts from the user experience.

In some implementations, the techniques adjust an extrafoveal area outside of the FGZ by adding content associated with the three-dimensional (3D) space of the user's physical environment. For example, the added elements may be fixed with respect to the inertial world (e.g., real world physical environment) that the user is in (e.g., a room). As a result, the user may move relative to added elements in an extended reality (XR) environment and the motion that the user perceives (with respect to the added elements) matches the information from the user's vestibular system (e.g., vestibular cues). This matching of visual cues with vestibular cues may reduce motion sickness or otherwise improve the user experience.

In some implementations, a device (e.g., a handheld, laptop, desktop, or head-mounted device (HMD)) provides an experience (e.g., a visual and/or auditory experience) to the user and obtains, with a sensor, physiological data (e.g., gaze characteristics) and motion data (e.g., controller moving the avatar, head movements, etc.) associated with a response of the user to the experience. Based on the obtained physiological data, the techniques described herein can determine a user's vestibular cues during the experience (e.g., an XR experience) by tracking the user's gaze characteristic(s) and other interactions (e.g., user movements in the physical environment, or moving within the XR environment such as moving a virtual avatar with a controller). Based on the vestibular cues, the techniques can adjust content (e.g., reduce contrast or spatial frequency) and/or add additional content (e.g., noise, structured patterns, etc.) to reduce motion sickness.

In general, one innovative aspect of the subject matter described in this specification can be embodied in methods that include the actions of, at an electronic device having a processor, determining a first zone and a second zone of a display, generating images of a three-dimensional (3D) environment, identifying image content of each of the images corresponding to the second zone of the display, and reducing at least one of contrast or spatial frequency of the image content of each of the images corresponding to the second zone of the display.

These and other embodiments can each optionally include one or more of the following features.

In some aspects, determining the first zone and the second zone of the display includes tracking a gaze of a user relative to the display, and tracking the first zone and the second zone of the display based on the gaze of the user.

In some aspects, tracking the gaze of the user relative to the display includes tracking a pixel the user's gaze is currently focused upon.

In some aspects, tracking the first zone and the second zone of the display based on the gaze includes identifying a foveated gaze zone (FGZ) of the user as the first zone of the display and identifying an extrafoveal zone of the user as the second zone of the display.

In some aspects, the display is presented to the user as a first projection for a first eye of the user and a second projection for a second eye of the user.

In some aspects, reducing contrast or spatial frequency of the image content of each of the images corresponding to the second zone of the display includes reducing the contrast. In some aspects, reducing contrast or spatial frequency of the image content of each of the images corresponding to the second zone of the display includes reducing the spatial frequency. In some aspects, reducing contrast or spatial frequency of the image content of each of the images corresponding to the second zone of the display is based on a function of eccentricity. In some aspects, reducing contrast or spatial frequency of the image content of each of the images corresponding to the second zone of the display is based on a function of eccentricity and speed. In some aspects, reducing contrast or spatial frequency of the image content of each of the images corresponding to the second zone of the display is based on a function of optic flow.

In some aspects, the electronic device is a head-mounted device (HMD).

In some aspects, the 3D environment is based on a user position and/or a user orientation controlled based on a movement of the device, additional input, and/or dynamics/kinematics. In some aspects, the 3D environment is a extended reality (XR) experience that is presented to the user. In some aspects, the 3D environment is a mixed reality (MR) experience that is presented to the user. In some aspects, the 3D environment is a real-world experience that is presented to the user.

In general, one innovative aspect of the subject matter described in this specification can be embodied in methods that include the actions of, at an electronic device having a processor, tracking a gaze of a user relative to a display; tracking a first zone and a second zone of the display based on the gaze, generating images of a three-dimensional (3D) environment based on the tracking of the first zone and the second zone, identifying image content of each of the images corresponding to the second zone of the display, and adjusting the image content of each of the images corresponding to the second zone of the display by adding elements at 3D positions that are anchored relative to vestibular cues of a user in a physical environment.

These and other embodiments can each optionally include one or more of the following features.

In some aspects, tracking the gaze of the user relative to the display includes tracking a pixel the user's gaze is currently focused upon.

In some aspects, tracking a first zone and a second zone of the display based on the gaze includes identifying a foveal gaze zone of the user as the first zone of the display and identifying an extrafoveal gaze zone of the user as the second zone of the display.

In some aspects, the display is presented to the user as a first projection for the first eye of the user and a second projection for the second eye of the user.

In some aspects, adjusting the image content of each of the images corresponding to the second zone of the display by adding elements at 3D positions includes adding points that are on a sphere that includes an origin located at a head of the user.

In some aspects, the added points on the sphere are configured to move from frame-to-frame of the images based on the head of the user translating and/or rotating.

In some aspects, the added points on the sphere includes adding white noise, Perlin noise, or grid lines.

In some aspects, adjusting the image content of each of the images corresponding to the second zone of the display by adding elements at 3D positions includes adding points that are on vertical parallel planes on both sides of a head of the user. In some aspects, the added points on the vertical parallel planes are configured to move from frame-to-frame of the images based on the head of the user translating and/or rotating and/or based on additional input at the device by the user. In some aspects, the added points on the vertical parallel planes includes adding a structured pattern or an unstructured pattern.

In some aspects, the 3D environment includes a room that includes walls, wherein adjusting the image content of each of the images corresponding to the second zone of the display by adding elements at 3D positions includes adding points that are inertially fixed to an area around the user that is based on the walls of the room of the 3D environment.

In some aspects, the added points to the area around the user are configured to move from frame-to-frame of the images based on movements of the user within the 3D environment.

In some aspects, the added points to the area around the user are based on a surface feature of a plurality of surface features of the 3D environment.

In some aspects, adjusting the image content of each of the images corresponding to the second zone of the display by adding elements at 3D positions includes determining a sphere surrounding the user that includes an origin located at a head of the user, and generating a stationary object field within the 3D environment that includes a plurality of objects, wherein a portion of the plurality of objects become visible to the user at an intersection of the sphere and the stationary object field.

In some aspects, the portion of the plurality of objects are configured to fade in and out as a function of their radial position with respect to the sphere.

In some aspects, the visible objects around the user are configured to move from frame-to-frame of the images based on cues of the user within the 3D environment.

In some aspects, the added elements at the 3D positions are based on inertial motion of the user.

In some aspects, the electronic device is a head-mounted device (HMD).

In some aspects, the 3D environment is based on a user position and/or a user orientation controlled based on a movement of the device, additional input, and/or dynamics/kinematics.

In some aspects, the 3D environment is an extended reality (XR) experience that is presented to the user. In some aspects, the 3D environment is a mixed reality (MR) experience that is presented to the user. In some aspects, the 3D environment is a real-world experience that is presented to the user.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 2:
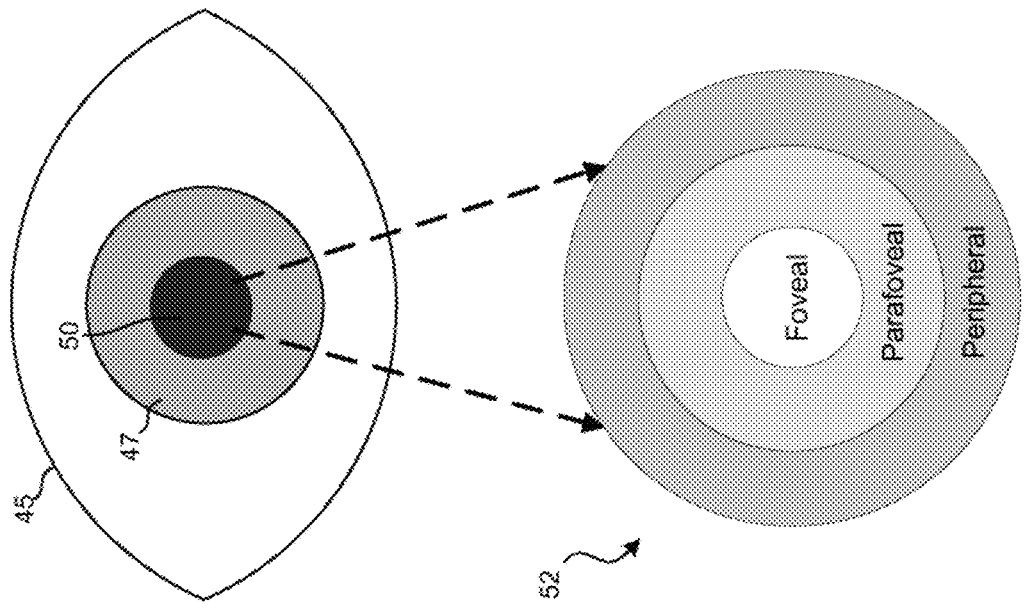
FIG. 2 illustrates a pupil of the user of FIG. 1 and a diagram of a vision field of the pupil including the fovea, parafovea, and peripheral vision regions.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

Figure 1:
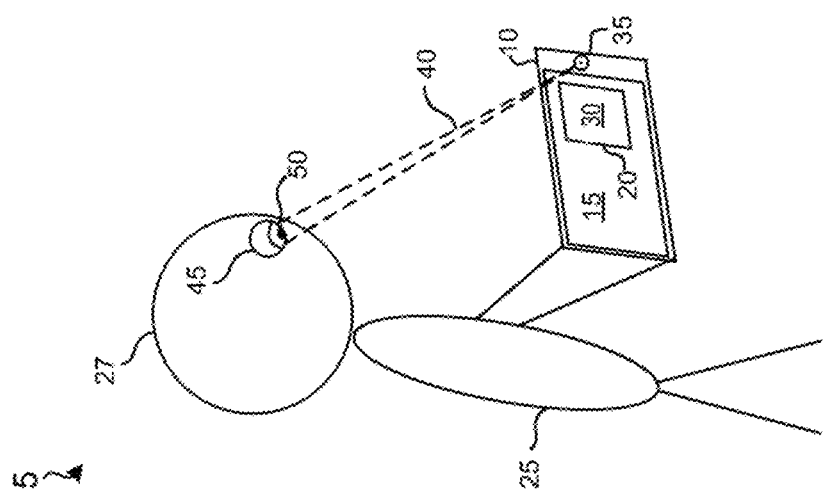
FIG. 1 illustrates a device displaying a visual experience and obtaining physiological data from a user according to some implementations.

FIG. 1 illustrates a real-world environment 5 including a device 10 with a display 15. In some implementations, the device 10 displays content 20 to a user 25, and a visual characteristic 30 that is associated with content 20. For example, content 20 may be a button, a user interface icon, a text box, a graphic, etc. In some implementations, the visual characteristic 30 associated with content 20 includes visual characteristics such as hue, saturation, size, shape, spatial frequency, motion, highlighting, etc. For example, content 20 may be displayed with a visual characteristic 30 of green highlighting covering or surrounding content 20.

In some implementations, content 20 may be a visual experience (e.g., extended reality (XR) experience), and the visual characteristic 30 of the visual experience may continuously change during the visual experience. As used herein, the phrase "experience" refers to a period of time during which a user uses an electronic device and has one or more gaze characteristics and vestibular cues. An experience may involve avatar motion (camera motion) controlled by the combined inputs from the HMD tracking (e.g., an inertial measurement unit (IMU) and base station) and a controller input device that includes dynamic/kinematics. Inertial head pose measurements may be obtained by the IMU or other tracking systems. In one example, a user has an experience in which the user perceives a real-world environment while holding, wearing, or being proximate to an electronic device that includes one or more sensors that obtains physiological data to assess an eye characteristic that is indicative of the user's gaze characteristics, and motion data of a user.

In some implementations, the visual characteristic 30 is a feedback mechanism for the user that is specific to the experience (e.g., a visual or audio cue presented during an experience). In some implementations, the visual experience (e.g., content 20) can occupy the entire display area of display 15. For example, content 20 may be a sequence of images that may include visual and/or audio cues as the visual characteristic 30 presented to the user (e.g., 360-degree video on a head mounted device (HMD)).

The device 10 obtains physiological data (e.g., pupillary data) from the user 25 via a sensor 35. For example, the device 10 obtains eye gaze characteristic data 40. While this example and other examples discussed herein illustrate a single device 10 in a real-world environment 5, the techniques disclosed herein are applicable to multiple devices as well as to other real-world environments. For example, the functions of device 10 may be performed by multiple devices.

In some implementations, as illustrated in FIG. 1, the device 10 is a handheld electronic device (e.g., a smartphone or a tablet). In some implementations, the device 10 is a wearable HMD. In some implementations the device 10 is a laptop computer or a desktop computer. In some implementations, the device 10 has a touchpad and, in some implementations, the device 10 has a touch-sensitive display (also known as a "touch screen" or "touch screen display").

In some implementations, the device 10 includes an eye tracking system for detecting eye position and eye movements. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye tracking system may be analyzed to detect position and movements of the eyes of the user 25, or to detect other information about the eyes such as pupil dilation or pupil diameter. Moreover, the point of gaze estimated from the eye tracking images may enable gaze-based interaction with content shown on the display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, the device 10 employs various physiological sensor, detection, or measurement systems. In an exemplary implementation, detected physiological data includes inertial head pose measurements determined by an IMU or other tracking system. In some implementations, detected physiological data may include, but is not limited to, electroencephalography (EEG), electrocardiography (ECG), electromyography (EMG), functional near infrared spectroscopy signal (fNIRS), blood pressure, skin conductance, or pupillary response. Moreover, the device 10 may simultaneously detect multiple forms of physiological data in order to benefit from synchronous acquisition of physiological data. Moreover, in some implementations, the physiological data represents involuntary data, e.g., responses that are not under conscious control. For example, a pupillary response may represent an involuntary movement.

FIG. 2 illustrates an eye 45 that includes an iris 47 and the pupil 50 of the user 25 of FIG. 1 in which the diameter of the pupil 50 may vary with time. FIG. 2 also illustrates a diagram 52 of the vision field for the pupil 50, including the fovea, parafovea, and peripheral vision regions with an exemplary degree of the visual field that the regions can see. In the human eye, the three vision field regions are asymmetric. In regard to a humans gaze zones, a person's vision includes a foveated gaze zone (FGZ), a parafoveal gaze zone, and a perifoveal zones. The parafoveal and perifoveal zones when discussed in combination are also referred to herein as an "extrafoveal zone". For example, the extrafoveal zone is the vision zone outside of the users FGZ. In some implementations, the vision zones discussed herein may be extra-macular zones (e.g., an area larger than the fovea zones that includes the parafoveal and perifoveal zones).

Returning to FIG. 1, according to some implementations, the device 10 may generate and present an XR environment to their respective users. A person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

Figure 3:
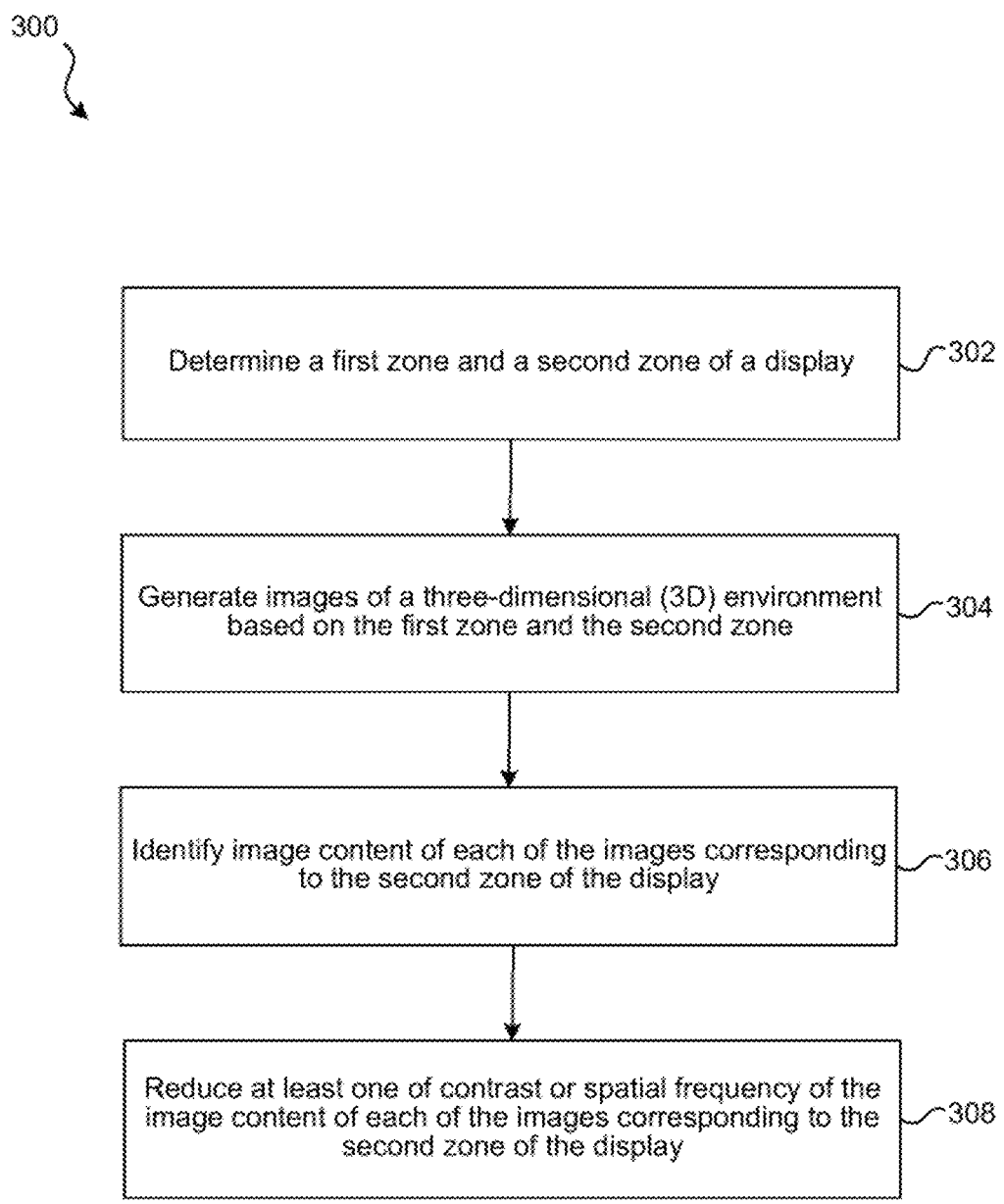
FIG. 3 is a flowchart representation of adjusting image content to reduce motion sickness in accordance with some implementations.

FIG. 3 is a flowchart illustrating an exemplary method 300. In some implementations, a device such as device 10 (FIG. 1) performs the techniques of method 300 to adjust image content to reduce motion sickness during an experience (e.g., visual and/or auditory electronic content that could be of the real-world physical environment, virtual content, or a combination of each). In some implementations, the techniques of method 300 are performed on a mobile device, desktop, laptop, HMD, or server device. In some implementations, the method 300 is performed on processing logic, including hardware, firmware, software, or a combination thereof. In some implementations, the method 300 is performed on a processor executing code stored in a non-transitory computer-readable medium (e.g., a memory). Examples of method 300 are illustrated with reference to FIGS. 4-5.

At block 302, the method 300 determines a first zone and a second zone of a display. In some implementations, determining a first zone and a second zone may include determining a concentric area as the first zone with constant radius in the center of the display, and the remaining area outside of the first zone is determined as the second zone. In some implementations, determining a first zone and a second zone may include determining a varying concentric area as the first zone with varying radius in the center of the display. For example, the radius may be a function of longitudinal and rotational velocity, and the radius may decrease from larger than the display dimensions to a predetermined minimum value.

In some implementations, the method 300 determines the first zone and the second zone of the display by tracking a gaze of a user relative to the display, and tracking the first zone and the second zone of the display based on the gaze of the user. In some implementations, determining a first zone and a second zone may include identifying a FGZ and an extrafoveal zone (e.g., parafoveal and perifoveal zones) based on the user's current gaze. In some implementations, the first zone and the second zone are not necessarily adjacent to each other. For example, the second zone could include the perifoveal zone, but not the parafoveal zone which is adjacent to the FGZ. Thus, for example, tracking a first zone and a second zone may include tracking the FGZ and the perifoveal zones. In some implementations, the second zone includes an area larger than the fovea, such as outside the macula (e.g., extra-macular zone).

In some implementations, tracking the gaze of a user may include tracking which pixel the user's gaze is currently focused upon. For example, obtaining physiological data (e.g., eye gaze characteristic data 40) associated with a gaze of a user may involve obtaining images of the eye or electrooculography signal (EOG) data from which gaze direction and/or movement can be determined. In some implementations, the experience may be an XR experience provided while a user wears a device such as an HMD. In some implementations, the experience is a real-world experience that is presented to the user. For example, the experience may include a real time video of a physical environment (e.g., a live scenic view of nature for meditation) or a live view through an HMD (e.g., the user is located at a real-world scenic view of nature for meditation, such as a quiet park). Additionally, the experience may be a MR experience that is presented to the user where virtual reality images may be overlaid onto the live view (e.g., augmented reality (AR)) of the physical environment. In some implementations, tracking the gaze of the user relative to the display includes tracking a pixel the user's gaze is currently focused upon.

In some implementations, tracking a gaze characteristic (e.g., eye gaze characteristic data 40) includes tracking a direction of the gaze, a velocity of the gaze, and/or gaze fixations (e.g., derived from eye gaze dynamics and saccade characteristics). In some implementations, the gaze characteristic is derived from a saccade characteristic (e.g., microsaccades and saccadic intrusions). In some implementations, other measures of gaze characteristic stability can include intersaccade interval (amount of time between saccades), microsaccade rate, and determined head movements from an inertial measurement unit (IMU) and/or cameras (e.g., IMU and/or cameras on a device, such as device 10 of FIG. 1).

In some implementations, tracking a first zone and a second zone of the display based on the gaze includes identifying a FGZ of the user as the first zone of the display and identifying an extrafoveal zone of the user as the second zone of the display. In some implementations, tracking a first zone and a second zone of the display based on the gaze includes identifying a FGZ of the user as the first zone of the display and identifying and a parafoveal and/or a perifoveal zone of the user as the second zone of the display. In some implementations, identifying an extrafoveal zone of the user as the second zone of the display may include an entire area outside of the FGZ, or the extrafoveal zone may include the parafoveal zone and the perifoveal zone (e.g., an extramacular zone).

In some implementations, there may be a display for each eye of the user. For example, the display may be presented to the user as a first projection for a first eye of the user and a second projection for a second eye of the user.

At block 304, the method 300 generates images (e.g., a sequence of 2D images rendered on an HMD) of a 3D environment based on the first zone (e.g., a stationary concentric area, a varying concentric area, the FGZ of the user, etc.) and the second zone (e.g., area outside of the concentric area, the extrafoveal zone, etc.). In some implementations, the 3D environment may be an XR environment or a 360-degree video. In some implementations, the view may be based on a viewer position or orientation controlled based on device movement, additional input, and/or dynamics/kinematics. For example, the user turns his head to look left, presses the hand controller up to move his avatar within the virtual world, and the avatar falls off a cliff.

In some implementations, the 3D environment is based on a user position and/or a user orientation controlled based on a movement of the device, additional input, and/or dynamics/kinematics. In some implementations, the 3D environment is an XR experience that is presented to the user. In some implementations, the 3D environment is a MR experience that is presented to the user. In some implementations, the 3D environment is a real-world experience (e.g., 360-degree video) that is presented to the user.

At block 306, the method 300 identifies image content of each of the images corresponding to the second zone of the display. For example, image content may be identified in the images of the visual experience (e.g., an XR experience) for the extrafoveal zone of the user. In some implementations, the second zone of the display could include the perifoveal zone, but not the parafoveal zone which is adjacent to the FGZ. Thus, for example, identifying image content in the second zone may include the perifoveal zone, but not the parafoveal zone, or vice versa.

At block 308, the method 300 reduces at least one of contrast or spatial frequency of the image content of each of the images corresponding to the second zone of the display. For example, the contrast or spatial frequency of the extrafoveal zone may be reduced. Contrast is the difference in luminance or color that makes an object distinguishable. Spatial frequency corresponds to the abruptness of spatial changes and level of detail in the image, e.g., high spatial frequency may correspond to sharp edges. In some implementations, the reduction of contrast and/or spatial frequency may be a function of eccentricity, eccentricity and speed, and/or optic flow.

In some implementations, reducing contrast or spatial frequency of the image content of each of the images corresponding to the second zone of the display includes reducing both the contrast and the spatial frequency. In some implementations, reducing contrast or spatial frequency of the image content of each of the images corresponding to the second zone of the display includes only reducing the contrast. In some implementations, reducing contrast or spatial frequency of the image content of each of the images corresponding to the second zone of the display includes only reducing the spatial frequency. In some implementations, reducing contrast or spatial frequency of the image content of each of the images corresponding to the second zone of the display is based on a function of eccentricity. In some implementations, reducing contrast or spatial frequency of the image content of each of the images corresponding to the second zone of the display is based on a function of eccentricity and speed. Speed can be the user's forward speed, or the user's rotational speed, or a weighted sum of forward and rotational speed. In some implementations, reducing contrast or spatial frequency of the image content of each of the images corresponding to the second zone of the display is based on a function of eccentricity and optic flow. Optic flow can be the velocity of each pixel in the display.

Figure 4A:
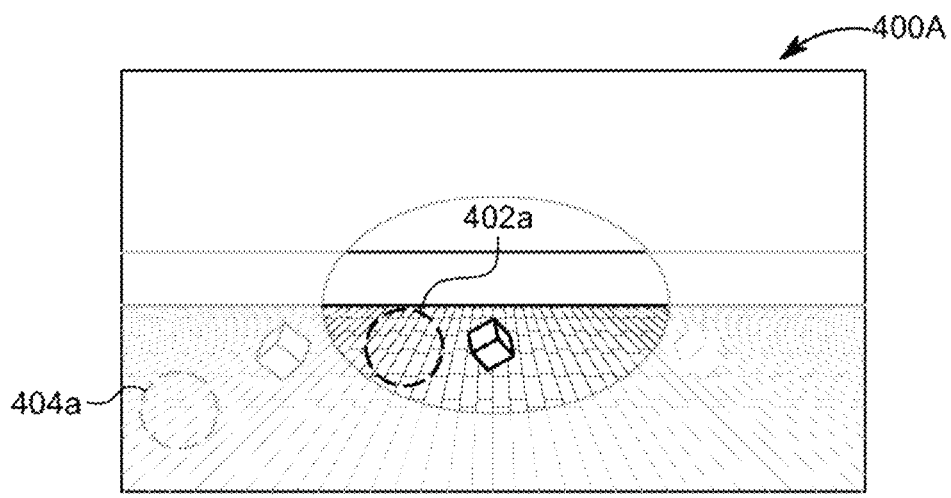
FIGS. 4A, 4B, and 4C are example screenshots that illustrate adjusting image content in accordance with some implementations.
Figure 4B:
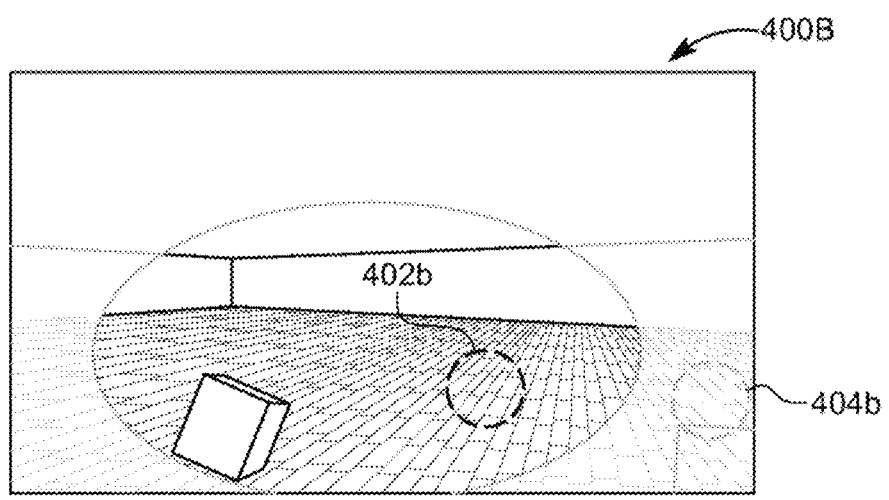
Figure 4C:
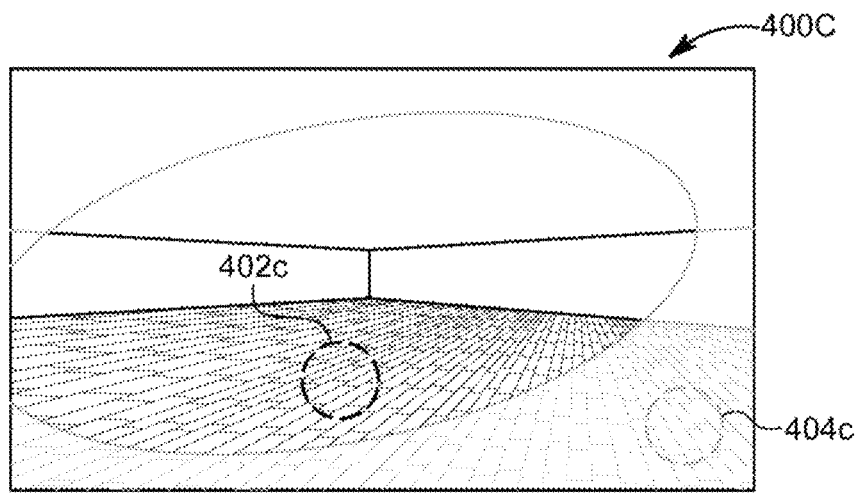

FIGS. 4A, 4B, and 4C are example screenshots 400A, 400B, and 400C, respectively, that illustrate adjusting image content in accordance with some implementations. In particular, screenshots 400A, 400B, and 400C each illustrate reducing the contrast outside of the FGZ for the extrafoveal view/zone (e.g., parafoveal and perifoveal zones) of a user (e.g. user 25). For example, area 402a, area 402b, and area 402c, (e.g., brick layered ground floor within an XR environment) represent an FGZ of a user. Moreover, area 404a, area 404b, and area 404c, represent an extrafoveal view of a user that is adjusted with reduced contrast to reduce motion sickness as the user is moving with respect to the virtual environment (e.g., moving his avatar) and with respect to the physical environment (e.g., moving his head rotational and/or translational movement, or physically moving in the physical environment such as walking in a room) within the XR environment. Screenshot 400A illustrates an example reduction in contrast that is concentric and a function of eccentricity (e.g., the local luminance is manipulated towards the average luminance as a function of eccentricity), but is not correlated to a speed of a user's movements. In some implementations, a function of eccentricity may be determined as a smooth step function based on an inner and outer radius. Screenshot 400B illustrates an example reduction in contrast that is concentric and a function of eccentricity and speed (e.g., the inertial and/or real motion of the user, such as detecting yawing where the user's head swivels along a horizontal axis). Screenshot 400C illustrates an example reduction in contrast that is a function of optical flow (e.g., a distribution of apparent velocities of movement of a brightness pattern in an image).

Figure 5A:
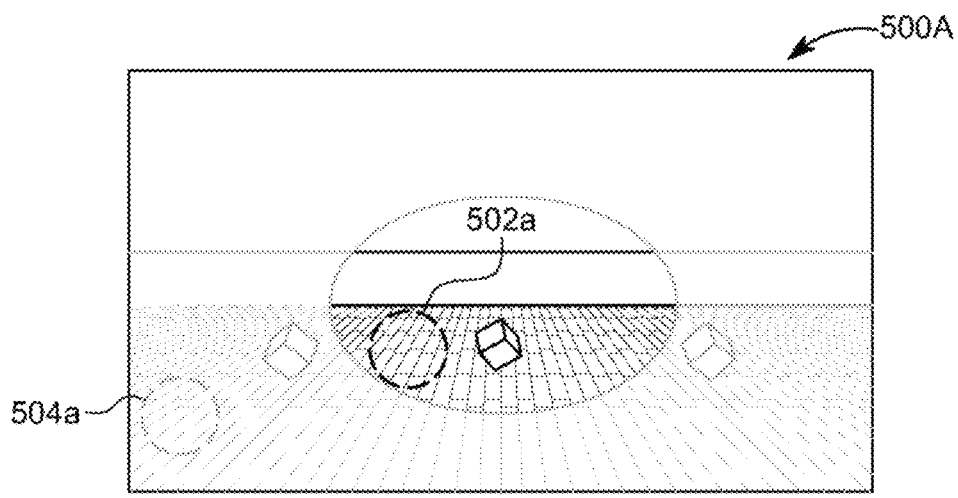
FIGS. 5A, 5B, and 5C are example screenshots that illustrate adjusting image content in accordance with some implementations.
Figure 5B:
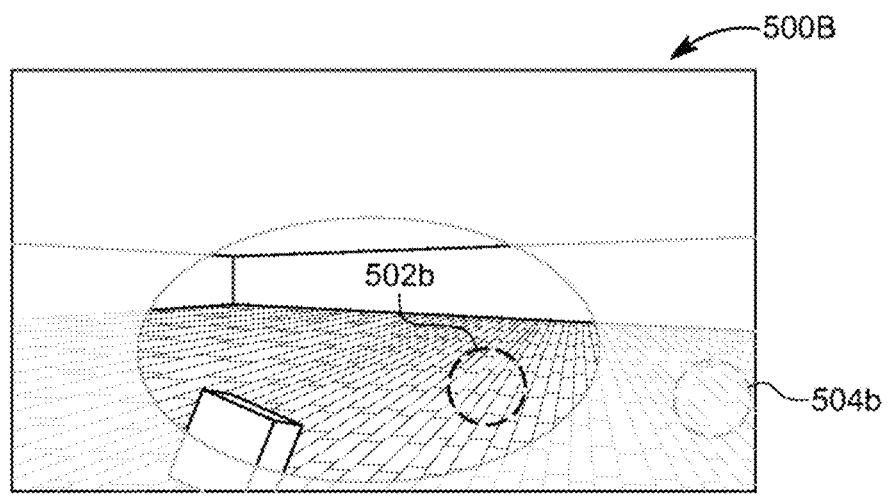
Figure 5C:
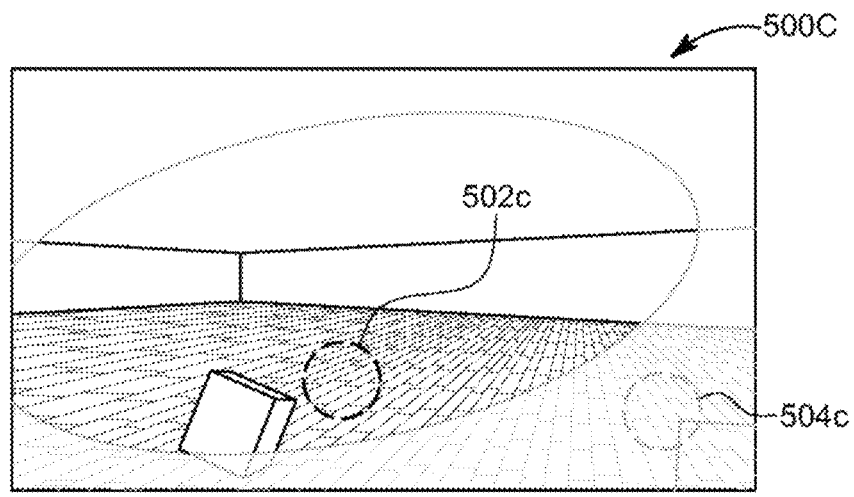

FIGS. 5A, 5B, and 5C are example screenshots 500A, 500B, and 500C, respectively, that illustrate adjusting image content in accordance with some implementations. In particular, screenshots 500A, 500B, and 500C each illustrate reducing the spatial frequency outside of the FGZ for the extrafoveal view/zone (e.g., parafoveal and perifoveal zones) of a user. For example, area 502a, area 502b, and area 502c, (e.g., brick layered ground floor within an XR environment) represent an FGZ of a user. Moreover, area 504a, area 504b, and area 504c, represent an extrafoveal view of a user that is adjusted with reduced contrast to reduce motion sickness as the user is moving with respect to the virtual environment (e.g., moving his avatar) and with respect to the physical environment (e.g., moving his head rotational and/or translational movement, or physically moving in the physical environment such as walking in a room) within the XR environment. Screenshot 500A illustrates an example reduction in spatial frequency that is concentric (e.g., a user's gaze is focused in the center) and a function of eccentricity (e.g., the area of spatial frequency in the extrafoveal view is based on how much of a conic section of the contrast deviates from being circular), but is not correlated to a speed of a user's movements. Screenshot 500B illustrates an example reduction in spatial frequency that is that is concentric and a function of eccentricity and speed (e.g., the inertial and/or real motion of the user, such as detecting yawing where the user's head swivels along a horizontal axis). Screenshot 500C illustrates an example reduction in spatial frequency that is a function of optical flow (e.g., a distribution of apparent velocities of movement of a brightness pattern in an image).

Figure 6:
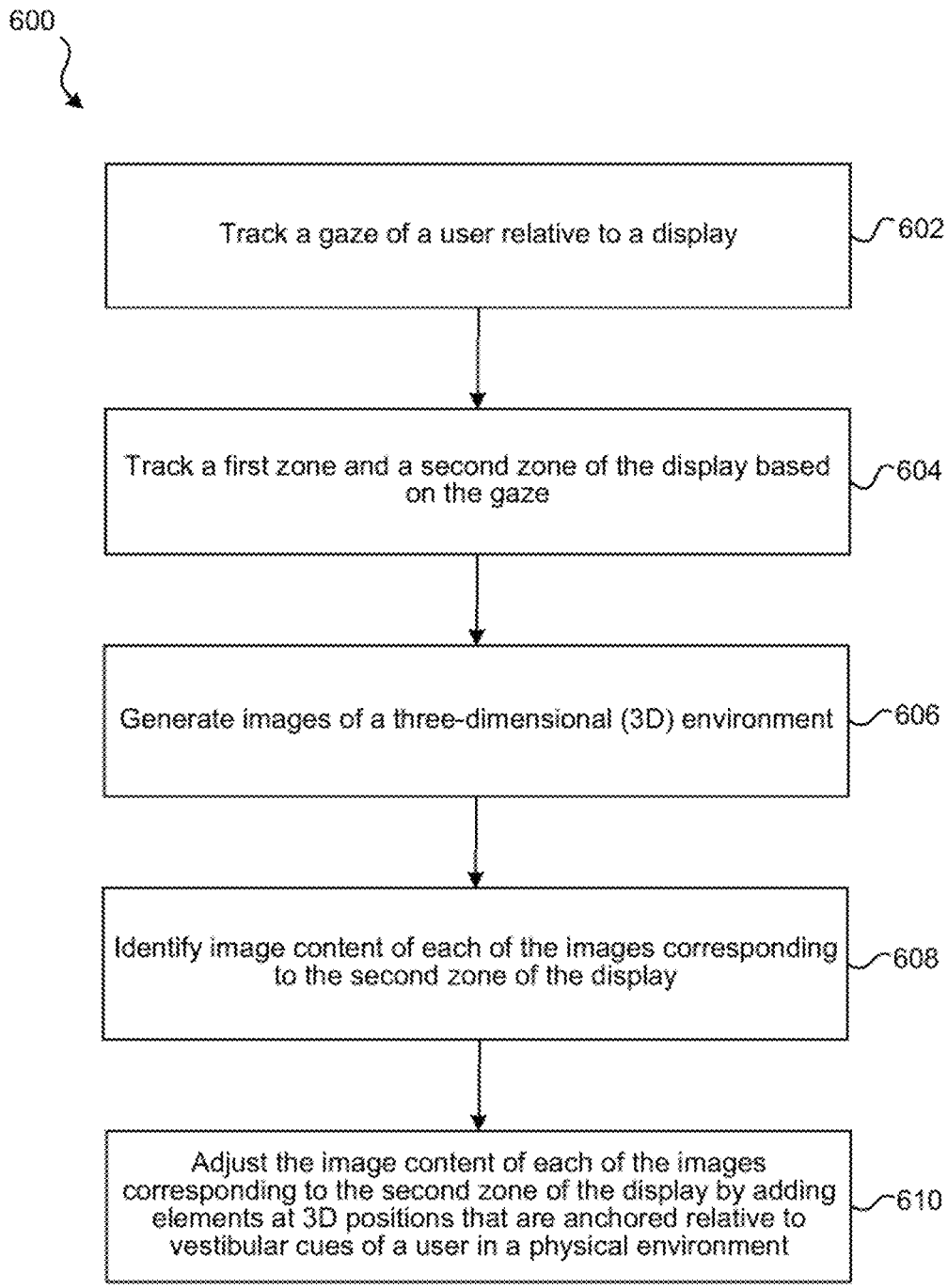
FIG. 6 is a flowchart representation of adjusting image content to reduce motion sickness in accordance with some implementations.

FIG. 6 is a flowchart illustrating an exemplary method 600. In some implementations, a device such as device 10 (FIG. 1) performs the techniques of method 600 to adjust image content outside of an area of high visual acuity (e.g., outside of the FGZ or the extra-macular zone) to reduce motion sickness during an experience (e.g., visual and/or auditory electronic content that could be of the real-world physical environment, virtual content, or a combination of each). In some implementations, the techniques of method 600 are performed on a mobile device, desktop, laptop, HMD, or server device. In some implementations, the method 600 is performed on processing logic, including hardware, firmware, software, or a combination thereof. In some implementations, the method 600 is performed on a processor executing code stored in a non-transitory computer-readable medium (e.g., a memory). Examples of method 600 are illustrated with reference to FIGS. 7-14.

At block 602, the method 600 tracks a gaze of a user relative to a display. In some implementations, tracking the gaze of a user may include tracking which pixel the user's gaze is currently focused upon. For example, obtaining physiological data (e.g., eye gaze characteristic data 40) associated with a gaze of a user may involve obtaining images of the eye or electrooculography signal (EOG) data from which gaze direction and/or movement can be determined. In some implementations, the experience may be an XR experience provided while a user wears a device such as an HMD. In some implementations, the experience is a real-world experience that is presented to the user. For example, the experience may include a real time video of a physical environment (e.g., a live scenic view of nature for meditation) or a live view through an HMD (e.g., the user is located at a real-world scenic view of nature for meditation, such as a quiet park). Additionally, the experience may be a MR experience that is presented to the user where virtual reality images may be overlaid onto the live view (e.g., augmented reality (AR)) of the physical environment. In some implementations, tracking the gaze of the user relative to the display includes tracking a pixel the user's gaze is currently focused upon.

In some implementations, tracking a gaze characteristic (e.g., eye gaze characteristic data 40) includes tracking a direction of the gaze, a velocity of the gaze, and/or gaze fixations (e.g., derived from eye gaze dynamics and saccade characteristics). In some implementations, the gaze characteristic is derived from a saccade characteristic (e.g., microsaccades and saccadic intrusions). In some implementations, other measures of gaze characteristic stability can include intersaccade interval (amount of time between saccades), microsaccade rate, and determined head movements from IMU and/or cameras (e.g., IMU and/or cameras on a device, such as device 10 of FIG. 1).

At block 604, the method 600 tracks a first zone and a second zone of the display based on the gaze. In some implementations, tracking a first zone and a second zone may include identifying a FGZ and an extrafoveal zone (e.g., parafoveal and perifoveal zones) based on the user's current gaze. In some implementations, there may be a display for each eye of the user. In some implementations, the first zone and the second zone are not necessarily adjacent to each other. For example, the second zone could include the perifoveal zone, but not the parafoveal zone which is adjacent to the FGZ.

In some implementations, tracking a first zone and a second zone of the display based on the gaze includes identifying a FGZ of the user as the first zone of the display and identifying an extrafoveal zone of the user as the second zone of the display. In some implementations, tracking a first zone and a second zone of the display based on the gaze includes identifying a FGZ of the user as the first zone of the display and identifying and a parafoveal and/or a perifoveal zone of the user as the second zone of the display. In some implementations, the display is presented to the user as a first projection for a first eye of the user and a second projection for a second eye of the user.

At block 606, the method 600 generates images (e.g., a sequence of 2D images rendered on an HMD) of a 3D environment. The generated images may or may not be based on the tracking of the first zone (e.g., FGZ) and the second zone (e.g., extrafoveal zone). In some implementations, the 3D environment may be an XR environment or a 360-degree video. In some implementations, the view may be based on a viewer position or orientation controlled based on device movement, additional input, and/or dynamics/kinematics. For example, the user turns his head to look left, presses the hand controller up to move his avatar within the virtual world, and the avatar falls off a cliff.

In some implementations, the 3D environment is based on a user position and/or a user orientation controlled based on a movement of the device, additional input, and/or dynamics/kinematics. In some implementations, the 3D environment is an XR experience that is presented to the user. In some implementations, the 3D environment is a MR experience that is presented to the user. In some implementations, the 3D environment is a real-world experience (e.g., 360-degree video) that is presented to the user.

At block 608, the method 600 identifies image content of each of the images corresponding to the second zone of the display. For example, image content may be identified in the images of the visual experience (e.g., an XR experience) for the extrafoveal zone of the user. In some implementations, the second zone of the display could include the perifoveal zone, but not the parafoveal zone which is adjacent to the FGZ. Thus, for example, identifying image content in the second zone may include the perifoveal zone, but not the parafoveal zone, or vice versa.

At block 610, the method 600 adjusts the image content of each of the images corresponding to the second zone of the display by adding elements at 3D positions that are anchored relative to vestibular cues of a user in a physical environment. For example, this may involve adding points that based on a virtual sphere having the sphere's origin at the user's head. Unlike the rest of the content, these points will only move from frame-to-frame based on the user's head translating and rotating and thus won't move based on input device input and dynamics/kinematics that move an avatar within the experience. In some implementations, the content may be unstructured, such as noise (e.g., white noise, Perlin noise, and the like). In some implementations, the content may be structured, such as gridlines. In some implementations, the added elements (e.g., points) at the 3D positions provide cues that are consistent with and based on the inertial motion of the user.

In some implementations, the techniques described herein relate to a 3 degrees of freedom (DoF) inertial anchor sphere implementation where the added points are configured to move from frame-to-frame based on the user's head translating and rotating, but the added points are configured not to move based on an input device input and dynamics/kinematics that move an avatar within an experience. Thus, in an exemplary implementation, adjusting the image content of each of the images corresponding to the second zone of the display by adding elements at 3D positions includes adding points that are on a sphere that includes an origin located at a head of the user. In some implementations, the added points on the sphere are configured to move from frame-to-frame of the images based on the head of the user translating and/or rotating. In some implementations, the added points on the sphere include adding white noise, Perlin noise, or a grid. The inertial anchor sphere implementation with three DoF is illustrated with reference to FIGS. 7-8.

In some implementations, the techniques described herein relate to a five DoF inertial anchor with vertical parallel planes implementation where the added points are configured to move from frame-to-frame based on the user's head translating and rotating and based on input device input and dynamics/kinematics that move an avatar within an experience. Thus, in an exemplary implementation, adjusting the image content of each of the images corresponding to the second zone of the display by adding elements at 3D positions includes adding points that are on vertical parallel planes that include an origin located at a head of the user. In some implementations, the added points on the vertical parallel planes are configured to move from frame-to-frame of the images based on the head of the user translating and/or rotating and/or based on additional input at the device by the user (e.g., movement of the avatar). In some implementations, the added points on the vertical parallel planes include adding a structured pattern (e.g., dots, grid, etc.) or an unstructured pattern (e.g., white noise, Perlin noise, etc.). The inertial anchor with vertical parallel planes implementation with five DoF is illustrated with reference to FIGS. 9-10.

In some implementations, the techniques described herein relate to a six DoF inertial anchor room implementation where the points will move from frame-to-frame based on all of the user's absolute cues within a room of the 3D environment, and the content uses a surface of the environment (e.g., brick wall) in the extrafoveal region. Thus, in an exemplary implementation, the 3D environment includes a room that includes walls, wherein adjusting the image content of each of the images corresponding to the second zone of the display by adding elements at 3D positions includes adding points that are inertially fixed to an area around the user that is based on the walls of the room of the 3D environment. In some implementations, the added points to the area around the user are configured to move from frame-to-frame of the images based on cues of the user within the 3D environment. In some implementations, the added points to the area around the user are based on a surface feature (e.g., brick walls) of a plurality of surface features of the 3D environment. The inertial anchor room implementation with six DoF is illustrated with reference to FIGS. 11-12.

In some implementations, the techniques described herein relate to a six DoF inertial anchor droplets implementation includes points that can move from frame-to-frame based on the user's inertial or real motion. The content may be droplets that are in a stationary droplet field that become visible in the intersection of the sphere and the droplet field or the droplets may fade in and out as a function of their radial position. Thus, in an exemplary implementation, adjusting the image content of each of the images corresponding to the second zone of the display by adding elements at 3D positions includes determining a sphere surrounding the user that includes an origin located at a head of the user, and generating a stationary droplet field within the 3D environment that includes a plurality of droplets, wherein a portion of the plurality of droplets become visible to the user at an intersection of the sphere and the stationary droplet field. In some implementations, the portion of the plurality of droplets are configured to fade in and out as a function of their radial position with respect to the sphere. In some implementations, the visible droplets around the user are configured to move from frame-to-frame of the images based on movement of the user within the 3D environment. The inertial anchor droplets implementation with six DoF is illustrated with reference to FIGS. 13-14.

Figure 7:
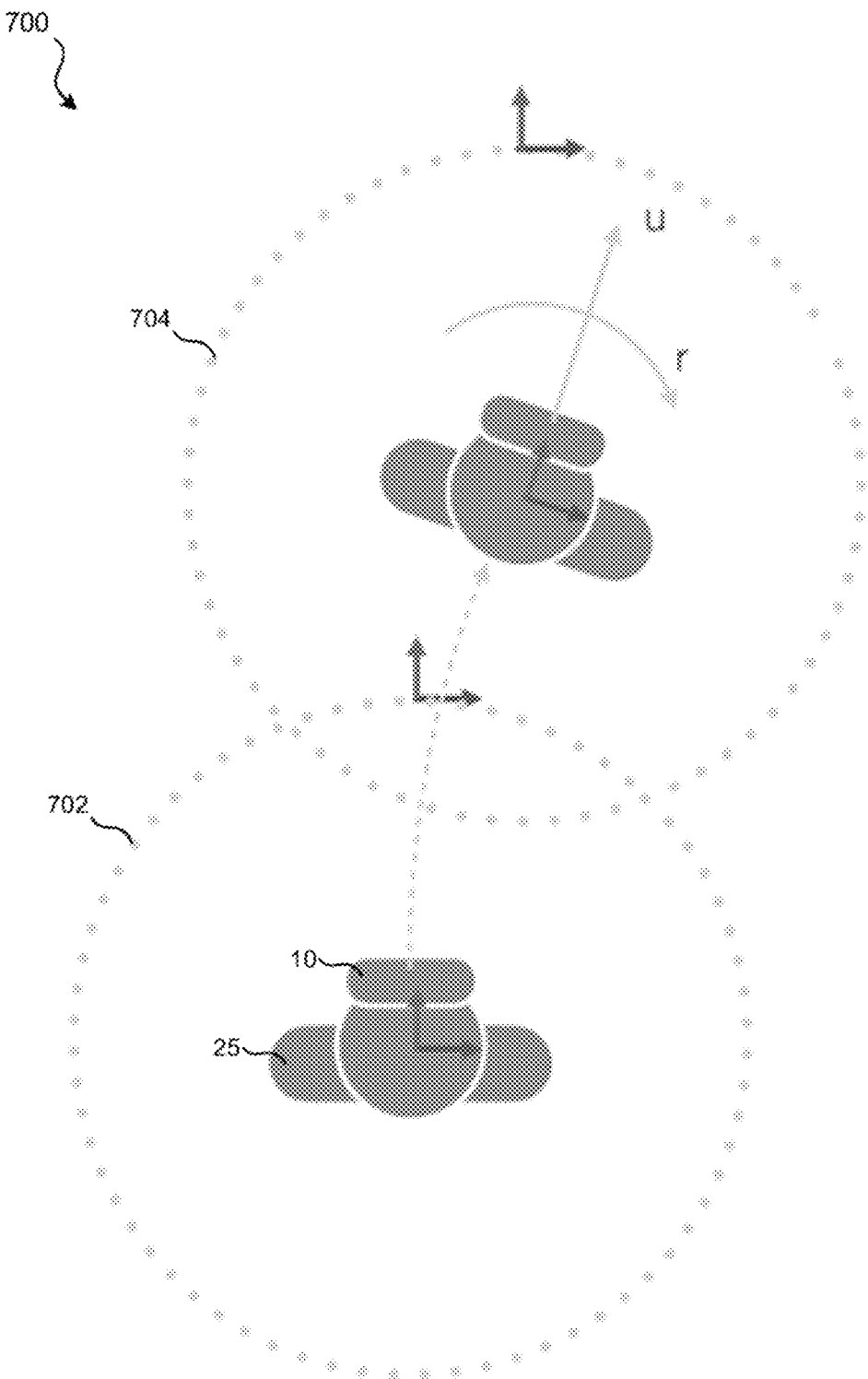
FIG. 7 illustrates tracking movement of a user, providing inertial cues in three degrees of freedom (DoF) during an extended reality (XR) experience in accordance with some implementations.

FIG. 7 illustrates an example environment 700 for tracking movement of a user for three DoF during an XR experience in accordance with some implementations. For example, user 25 is shown wearing a device 10 as an HMD during an XR experience. Environment 700 relates to a three DoF inertial anchor sphere implementation where added points are configured to move from frame-to-frame based on the user's head translating and rotating, but the added points are configured not to move based on an input device input and dynamics/kinematics that move an avatar within an experience. Thus, in an exemplary implementation, adjusting the image content of each of the images corresponding to the second zone of the display by adding elements at 3D positions includes adding points that are on a sphere that includes an origin located at a head of the user. For example, the sphere 702 represents a user's location and position of user's head at a first time, and sphere 704 represents a user's location and position of user's head at a second time, where "r" indicates yaw velocity, and "u" indicates surge velocity. The sphere 702, 704 includes the added points that surround the user 25 at a particular radius. In some implementations, the added points on the sphere are configured to move from frame-to-frame of the images based on the head of the user translating and/or rotating. In some implementations, the added points on the sphere include adding white noise, Perlin noise, or a grid, as illustrated in FIGS. 8A, 8B, and 8C, respectively.

Figure 8A:
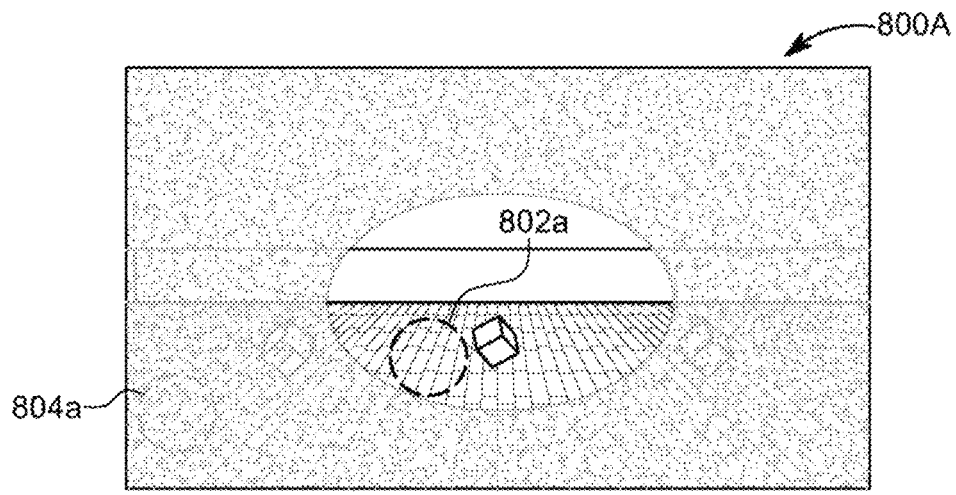
FIGS. 8A, 8B, and 8C are example screenshots that illustrate adjusting image content in accordance with some implementations.
Figure 8B:
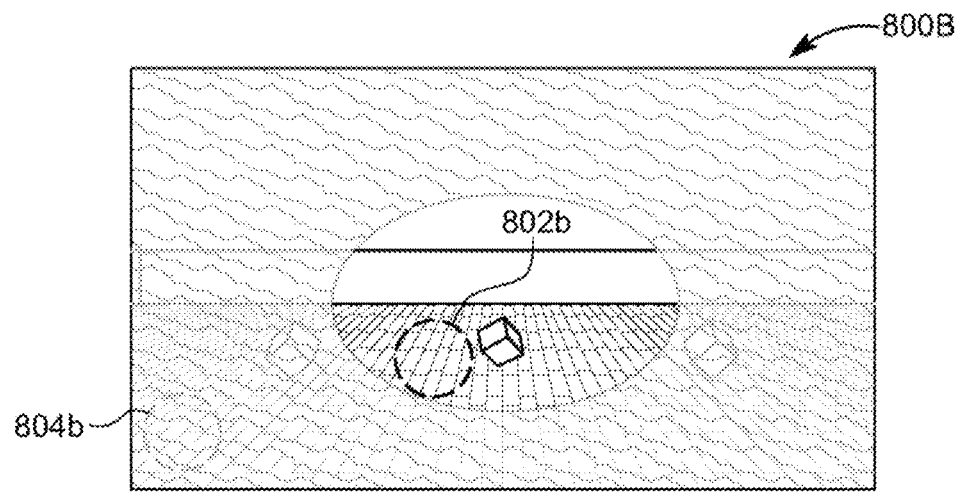
Figure 8C:
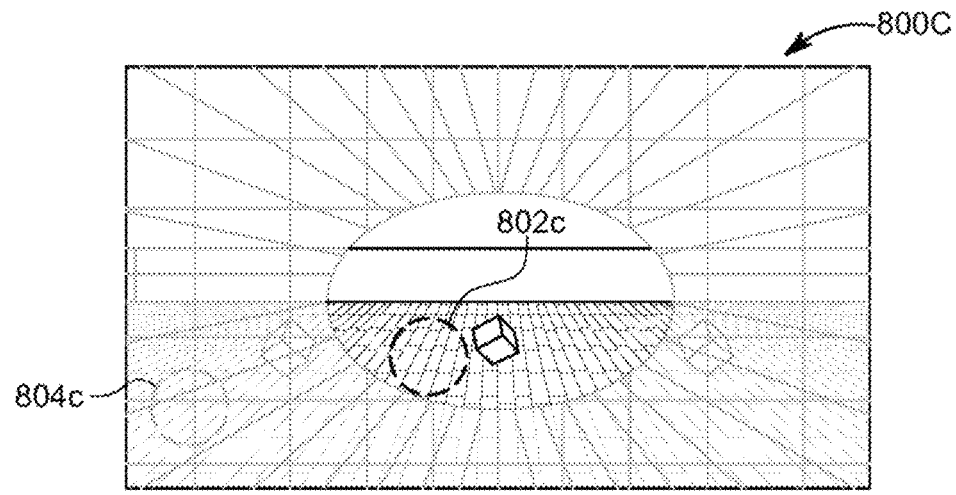

FIGS. 8A, 8B, and 8C are example screenshots 800A, 800B, and 800C, respectively, that illustrate adjusting image content in accordance with some implementations. In particular, screenshots 800A, 800B, and 800C each illustrate adding elements at 3D positions outside of the FGZ for the extrafoveal view/zone (e.g., parafoveal and/or perifoveal zones) of a user that are anchored relative to inertial motion of the user to reduce motion sickness as the user moves within the experience (e.g., an XR environment). As described above with respect to FIG. 7, screenshots 800A, 800B, and 800C are based on the three DoF sphere that is inertially orientated and has an origin with respect to the user's head. For example, area 802a, area 802b, and area 802c, (e.g., brick layered ground floor within an XR environment) represent an FGZ of a user. Moreover, area 804a, area 804b, and area 804c, represent an extrafoveal view of a user that is adjusted with added elements to reduce motion sickness as the user is moving with respect to the virtual environment (e.g., moving his avatar) and with respect to the physical environment (e.g., moving his head rotational and/or translational movement, or physically moving in the physical environment such as walking in a room) within the XR environment. Screenshot 800A illustrates an example addition of white noise (e.g., area 804a) and screenshot 800B illustrates an example addition of Perlin noise (e.g., area 804b). The added noise (e.g., white noise, Perlin noise, etc.) provides a user relative yaw, pitch, and roll cues with respect to the sphere that is inertially orientated and has an origin at the user's head. Screenshot 800C illustrates an example addition of gridlines that provides the user absolute yaw, pitch, and roll cues with respect to the sphere.

Figure 9:
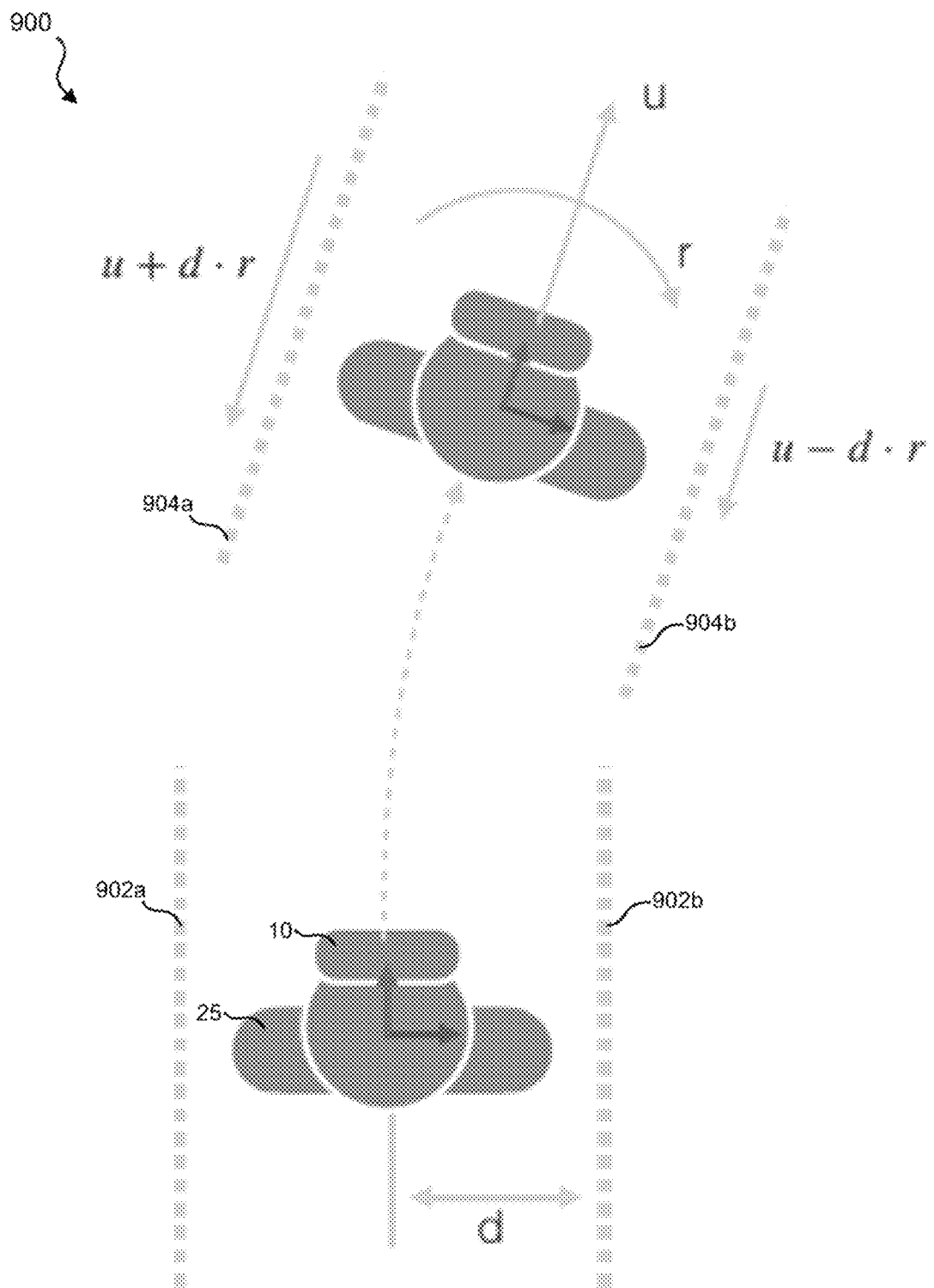
FIG. 9 illustrates tracking movement of a user, providing inertial cues in five DoF during an XR experience in accordance with some implementations.
Figure 10A:
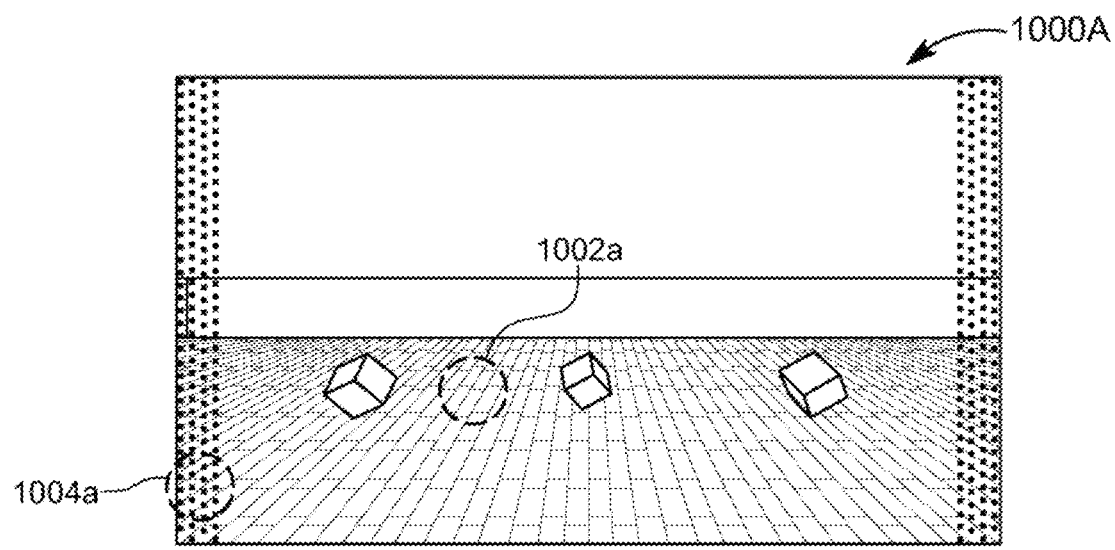
FIGS. 10A and 10B are example screenshots that illustrate adjusting image content in accordance with some implementations.
Figure 10B:
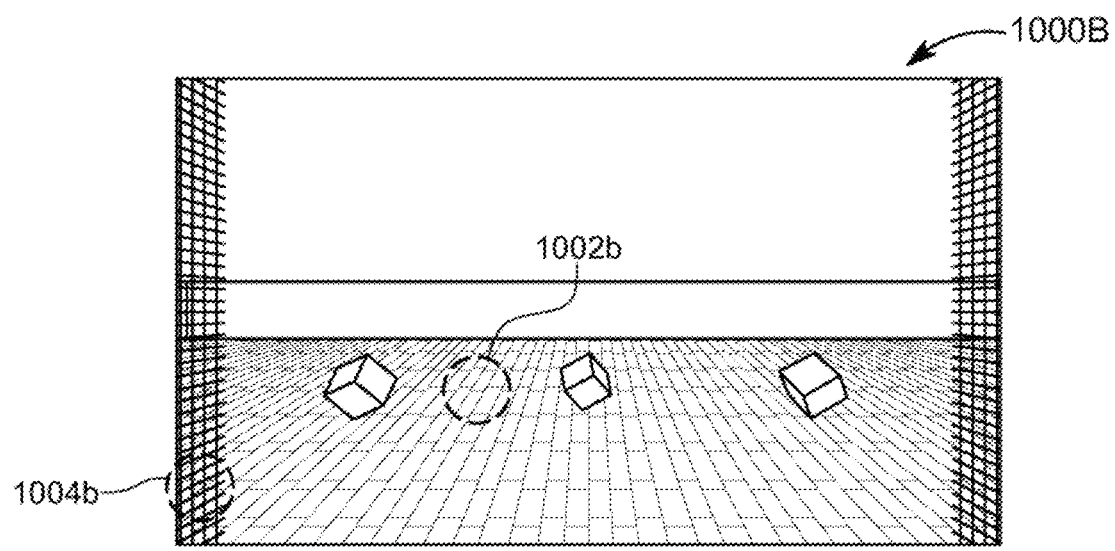

FIG. 9 illustrates an example environment 900 for tracking movement of a user for five DoF during an XR experience in accordance with some implementations. For example, user 25 is shown wearing a device 10 as an HMD during an XR experience. Environment 900 relates to a five DoF inertial anchor with vertical parallel planes implementation where the added points are configured to move from frame-to-frame based on the user's head translating and rotating and based on input device input and dynamics/kinematics that move an avatar within an experience. Thus, in an exemplary implementation, adjusting the image content of each of the images corresponding to the second zone of the display by adding elements at 3D positions includes adding points that are on vertical parallel planes or surfaces that include an origin located at a head of the user, which provides texture offset based on forward speed and yaw rate of a user. For example, the vertical parallel planes 902a, 902b represent a user's location and position of user's head at a first time, and vertical parallel planes 904a, 904b represents a user's location and position of user's head at a second time, where "r" indicates yaw velocity, and "u" indicates surge velocity. The parallel planes 902, 904 are parallel with respect to the user's z-axis, and include added points within the parallel lines that are near the user 25 at a lateral offset distance d, which can be based on relative optic flow speed and sensitivity to head movement of the user 25. In some implementations, the added points on the vertical parallel planes are configured to move from frame-to-frame of the images based on the head of the user translating and/or rotating and/or based on additional input at the device by the user (e.g., movement of the avatar). In some implementations, the added points on the vertical parallel planes include adding a structured pattern (e.g., dots, grid, etc.) as illustrated in FIGS. 10A and 10B, respectively. In some implementations, the added points on the vertical parallel planes include adding an unstructured pattern (e.g., white noise, Perlin noise, etc.), as illustrated in FIGS. 9A and 9B

FIGS. 10A and 10B are example screenshots 1000A and 1000B, respectively, that illustrate adjusting image content in accordance with some implementations. In particular, screenshots 1000A and 1000B each illustrate adding elements at 3D positions outside of the FGZ (e.g., parafoveal and/or perifoveal zones) of a user that are anchored relative to inertial motion of the user to reduce motion sickness as the user moves within the experience (e.g., an XR environment). As described above with respect to FIG. 9, screenshots 1000A and 1000B are based on the five DoF vertical parallel planes implementation where the vertical parallel planes are parallel with respect to the user's z-axis, and include added points within the parallel lines that are near the user 25 at a lateral offset distance d, which can be based on relative optic flow speed and sensitivity to head movement of the user 25. In some implementations, the added points on the vertical parallel planes (e.g., vertical parallel planes 902 and 904) include adding a structured pattern (e.g., dots, grid, etc.). For example, area 1002a and area 1002b (e.g., brick layered ground floor within an XR environment) represent an FGZ of a user. Moreover, area 1004a and area 1004b represent part of an extrafoveal view of a user (e.g., structured parallel lines) that is adjusted with added elements to reduce motion sickness as the user is moving with respect to the virtual environment (e.g., moving his avatar) and with respect to the physical environment (e.g., moving his head rotational and/or translational movement, or physically moving in the physical environment such as walking in a room) within the XR environment. Screenshot 1000A illustrates an example addition of a dot pattern (e.g., area 1004a) and screenshot 1000B illustrates an example addition of a grid pattern (e.g., area 1004b). The added structured pattern (e.g., dots, grids, and the like) provides a user's relative yaw, roll, surge, and heave cues and provides a user's absolute pitch cues. An added unstructured pattern (e.g., white noise, Perlin noise, etc.) will provide a user's relative yaw, pitch, roll, surge, and heave. Thus, an added structured pattern provides absolute pitch cues of a user's vestibular system cues versus an unstructured pattern that may only provide relative pitch cues.

Figure 11:
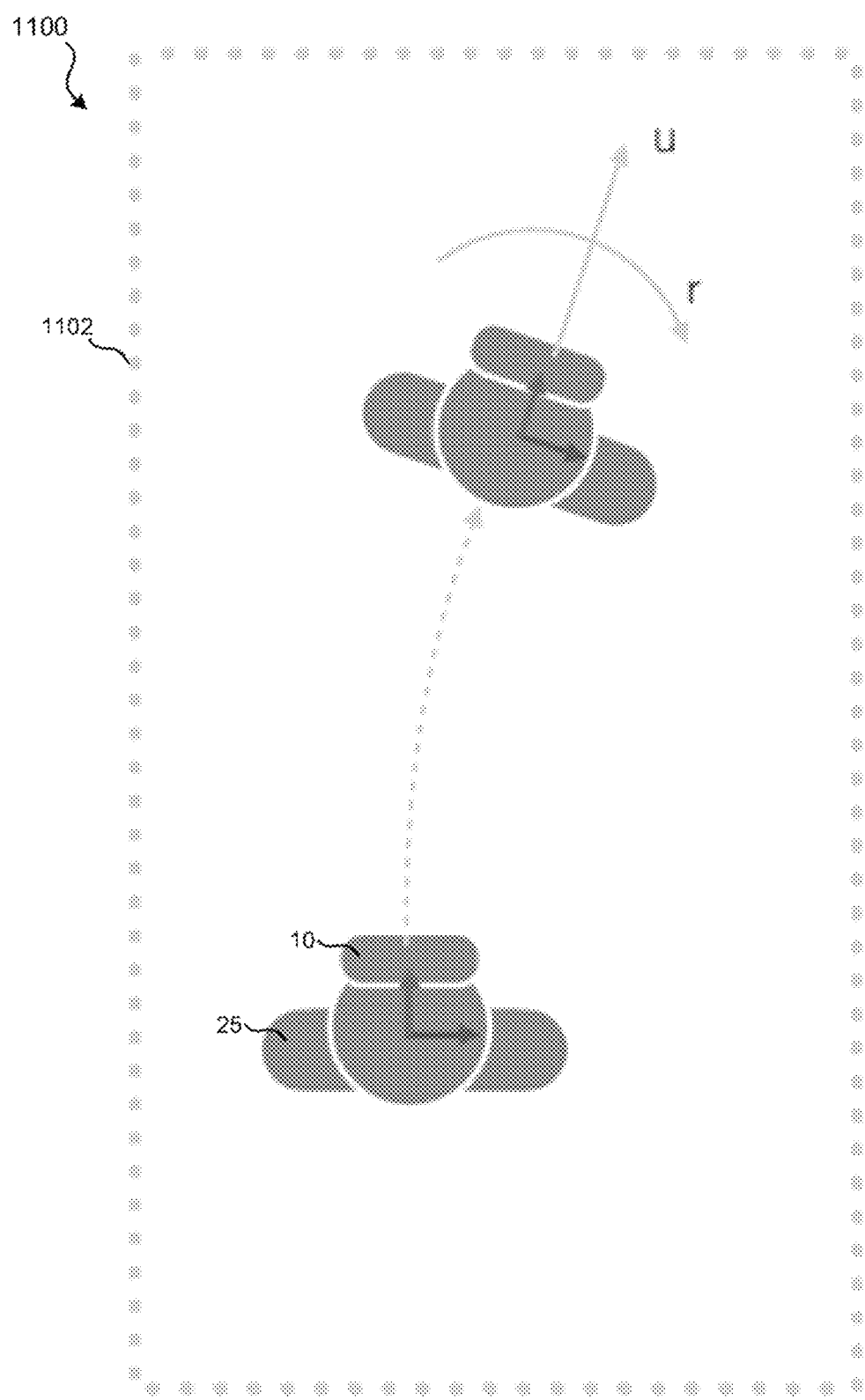
FIG. 11 illustrates tracking movement of a user, providing inertial cues in six DoF during an XR experience in accordance with some implementations.

FIG. 11 illustrates an example environment 1100 for tracking movement of a user for six DoF during an XR experience in accordance with some implementations. For example, user 25 is shown wearing a device 10 as an HMD during an XR experience. Environment 1100 relates to a six DoF inertial anchor within a room implementation where the added points are configured to move from frame-to-frame based on all of the user's absolute cues within a room of the 3D environment, and the content uses one or more surfaces of the environment (e.g., brick wall) in the extrafoveal region. Thus, in an exemplary implementation, the 3D environment includes a room that includes walls, wherein adjusting the image content of each of the images corresponding to the second zone of the display by adding elements at 3D positions includes adding points that are inertially fixed to an area around the user that is based on the walls of the room of the 3D environment. For example, the six DoF room 1102 represents a surface around a user (e.g., chaperone or coinciding with walls) that are inertially fixed with respect to the user in a physical environment, where "r" indicates yaw velocity, and "u" indicates surge velocity. In some implementations, the added points to the area around the user (e.g., six DoF room 1102) are configured to move from frame-to-frame of the images based on movement of the user within the 3D environment. In some implementations, the added points to the area around the user (e.g., six DoF room 1102) are based on a surface feature (e.g., brick walls) of a plurality of surface features of the 3D environment, as illustrated in FIG. 12.

Figure 12:
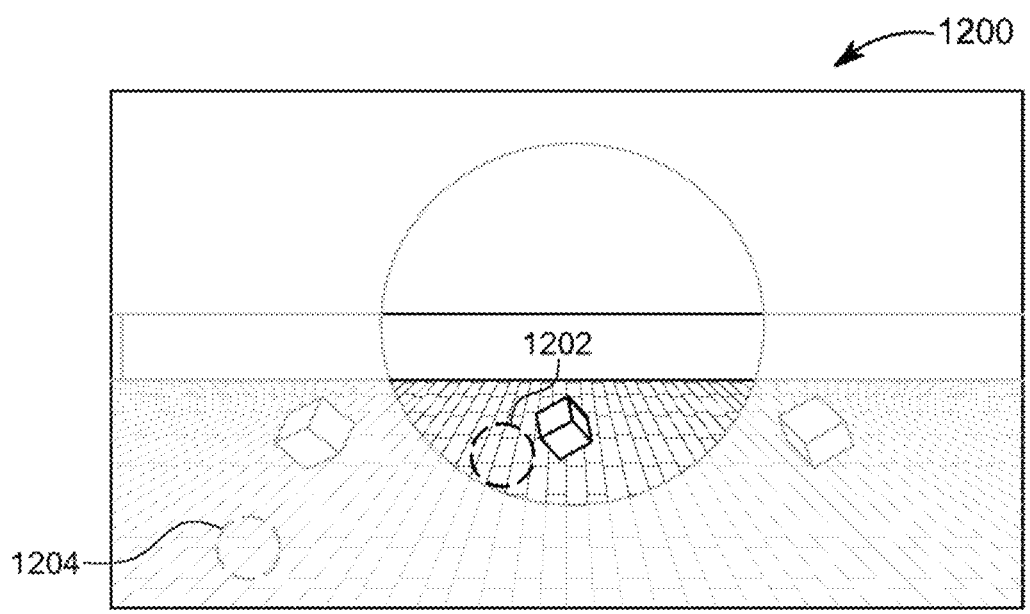
FIG. 12 is an example screenshot that illustrates adjusting image content in accordance with some implementations.

FIG. 12 is an example screenshot 1200 that illustrates adjusting image content in accordance with some implementations. In particular, screenshot 1200 illustrates adding elements at 3D positions outside of the FGZ for the extrafoveal view/zone (e.g., parafoveal and/or perifoveal zones) of a user that are anchored relative to inertial motion of the user to reduce motion sickness as the user moves within the experience (e.g., an XR environment). As described above with respect to FIG. 11, screenshot 1200 is based on the six DoF room implementation (e.g., six DoF room 1102). In some implementations, the added points on the six DoF room implementation (e.g., six DoF room 1102) are based on a surface feature (e.g., brick walls) of a plurality of surface features of the 3D environment. For example, area 1202 (e.g., brick layered ground floor within an XR environment) represents an FGZ of a user. Moreover, area 1204 represents part of an extrafoveal view of a user that is adjusted with added elements to reduce motion sickness as the user is moving with respect to the virtual environment (e.g., moving his avatar) and with respect to the physical environment (e.g., moving his head rotational and/or translational movement, or physically moving in the physical environment such as walking in a room) within the XR environment. Screenshot 1200 illustrates an example addition of a surface feature of the surrounding environment (e.g., brick wall). The added surface feature provides a user's absolute yaw, pitch, roll, surge, sway, and heave cues. The sensitivity of each of the absolute yaw, pitch, roll, surge, sway, and heave cues depends on a distance of the user with respect to a wall of the six DoF room (e.g., six DoF room 1102).

Figure 13:
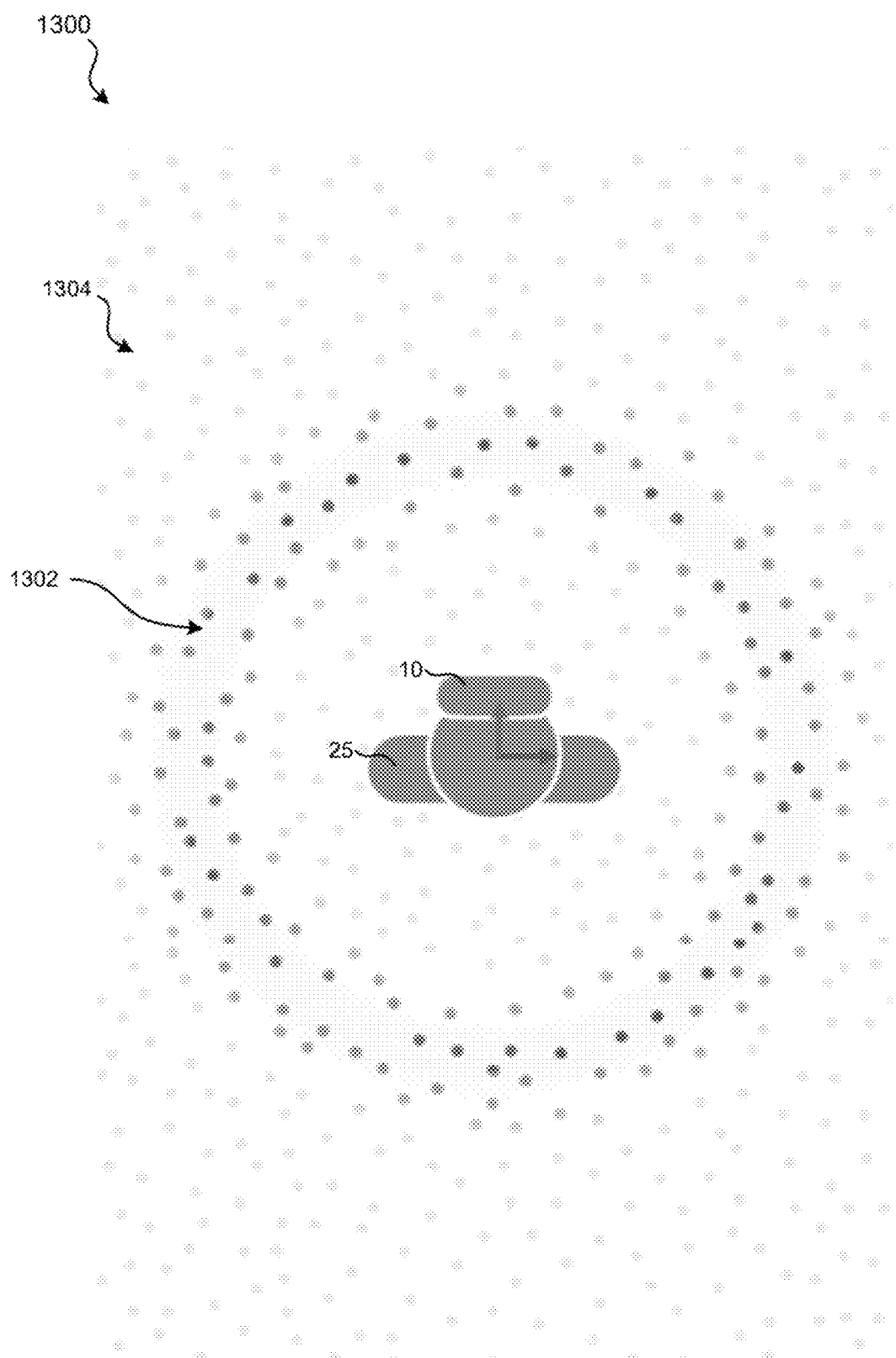
FIG. 13 illustrates tracking movement of a user, providing inertial cues in six DoF during an XR experience in accordance with some implementations.

FIG. 13 illustrates an example environment 1300 for tracking movement of a user for six DoF during an XR experience in accordance with some implementations. For example, user 25 is shown wearing a device 10 as an HMD during an XR experience. Environment 1300 relates to a six DoF inertial anchor within a spherical droplet implementation where the added points are configured to move from frame-to-frame based on the user's inertial or real motion. The content may be droplets that are in a stationary droplet field 1304 that become visible in the intersection of the sphere (e.g., droplet sphere 1302) and the droplet field (e.g., droplet field 1304) or the droplets may fade in and out as a function of their radial distance to the user. In some implementations, the content are droplets (as shown in FIG. 13). Alternatively, the content or may be any shape or object (e.g., random shapes, squares, blobs, smudges, stars, and the like). Thus, in an exemplary implementation, adjusting the image content of each of the images corresponding to the second zone of the display by adding elements at 3D positions includes determining a sphere surrounding the user that includes an origin located at a head of the user, and generating a stationary droplet field 1304 within the 3D environment that includes a plurality of droplets, wherein a portion of the plurality of droplets become visible to the user at an intersection of the sphere (e.g., droplet sphere 1302) and the stationary droplet field. For example, the droplet sphere 1302 represents a user's location and position of the user's head that are inertially fixed with respect to the user in a physical environment. In some implementations, the portion of the plurality of droplets are configured to fade in and out as a function of their radial distance with respect to the droplet sphere 1302. In some implementations, the visible droplets around the user are configured to move from frame-to-frame of the images based on inertial motion of the user within the 3D environment. The inertial anchor droplets implementation with six DoF is illustrated in FIG. 14.

Figure 14:
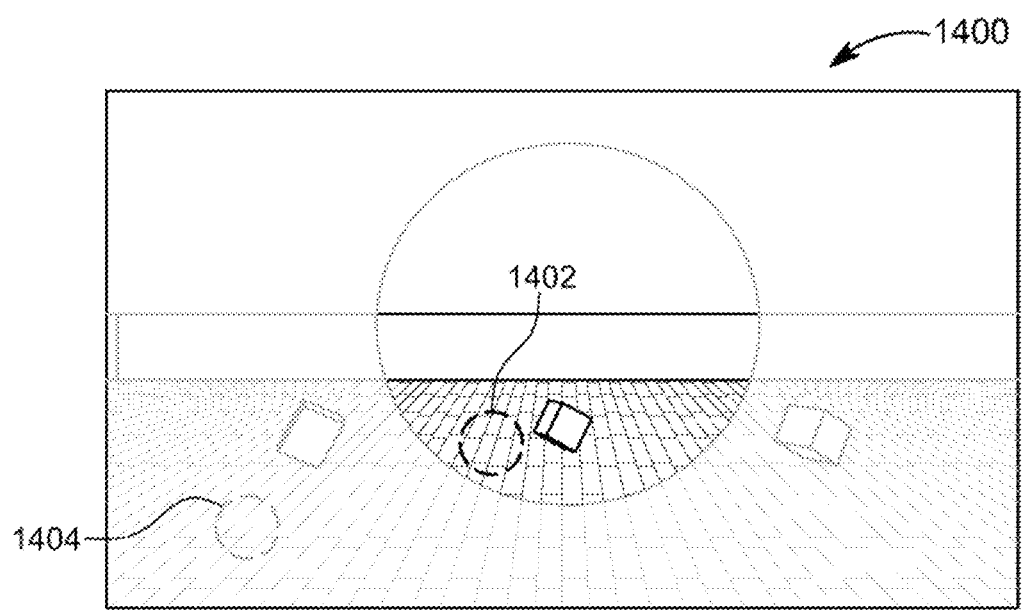
FIG. 14 is an example screenshot that illustrates adjusting image content in accordance with some implementations.

FIG. 14 is an example screenshot 1400 that illustrates adjusting image content in accordance with some implementations. In particular, screenshot 1400 illustrates adding elements (e.g., droplets) at 3D positions outside of the FGZ (e.g., parafoveal and/or perifoveal zones) of a user that are anchored relative to inertial motion of the user to reduce motion sickness as the user moves within the experience (e.g., an XR environment). As described above with respect to FIG. 13, screenshot 1400 is based on the six DoF spherical droplet implementation (e.g., droplet sphere 1302). In some implementations, the added points on the six DoF spherical droplet implementation (e.g., droplet sphere 1302) are stationary droplets (e.g., droplet field 1304) for the extrafoveal view/zone (e.g., parafoveal and/or perifoveal zones) of a user. For example, area 1402 (e.g., brick layered ground floor within an XR environment) represents an FGZ of a user. Moreover, area 1404 represents part of an extrafoveal view of a user that is adjusted with added elements (e.g., droplets within a droplet sphere such as droplet sphere 1302) to reduce motion sickness as the user is moving with respect to the virtual environment (e.g., moving his avatar) and with respect to the physical environment (e.g., moving his head rotational and/or translational movement, or physically moving in the physical environment such as walking in a room) within the XR environment. Screenshot 1400 illustrates an example addition of droplets within a sphere that is inertially fixed to the user on a sphere that includes an origin located at a head of the user. Each droplet in the droplet field 1304 may be transparent. The droplet sphere feature provides a user's relative yaw, pitch, roll, surge, sway, and heave cues. In some implementations, the portion of the plurality of droplets are configured to fade in and out as a function of their distance position with respect to the droplet sphere 1302.

In some implementations, a machine learning model (e.g., a trained neural network) is applied to identify patterns in physiological data, including identification of physiological responses to an experience (e.g., content 20 of FIG. 1). Moreover, the machine learning model may be used to match the patterns with learned patterns corresponding to indications of interest or intent of the user 25 to interact with the experience. In some implementations, the techniques described herein may learn patterns specific to the particular user 25. For example, the techniques may learn from determining that a peak pattern represents an indication of interest or intent of the user 25 in response to a particular visual characteristic 30 within the experience and use this information to subsequently identify a similar peak pattern as another indication of interest or intent of the user 25. Such learning can take into account the user's relative interactions with multiple visual characteristics 30, in order to further adjust the visual characteristic 30 and enhance the user's physiological response to the experience.

In some implementations, the location and features of the head 27 of the user 25 (e.g., an edge of the eye, a nose or a nostril) are extracted by the device 10 and used in finding coarse location coordinates of the eyes 45 of the user 25, thus simplifying the determination of precise eye 45 features (e.g., position, gaze direction, etc.) and making the gaze characteristic(s) measurement more reliable and robust. Furthermore, the device 10 may readily combine the 3D location of parts of the head 27 with gaze angle information obtained via eye part image analysis in order to identify a given on-screen object at which the user 25 is looking at any given time. In some implementations, the use of 3D mapping in conjunction with gaze tracking allows the user 25 to move his or her head 27 and eyes 45 freely while reducing or eliminating the need to actively track the head 27 using sensors or emitters on the head 27.

By tracking the eyes 45, some implementations reduce the need to re-calibrate the user 25 after the user 25 moves his or her head 27. In some implementations, the device 10 uses depth information to track the pupil's 50 movement, thereby enabling a reliable present pupil diameter 55 to be calculated based on a single calibration of user 25. Utilizing techniques such as pupil-center-corneal reflection (PCCR), pupil tracking, and pupil shape, the device 10 may calculate the pupil diameter 55, as well as a gaze angle of the eye 45 from a fixed point of the head 27, and use the location information of the head 27 in order to re-calculate the gaze angle and other gaze characteristic(s) measurements. In addition to reduced recalibrations, further benefits of tracking the head 27 may include reducing the number of light projecting sources and reducing the number of cameras used to track the eye 45.

Figure 15:
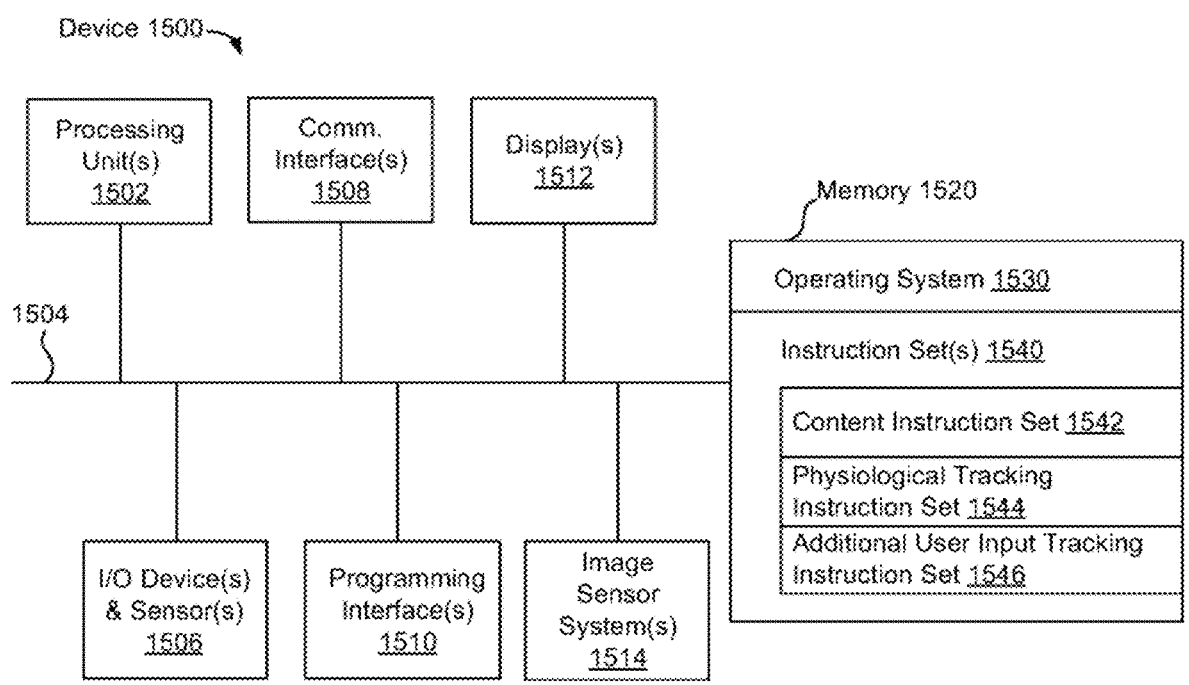
FIG. 15 is a block diagram illustrating device components of an exemplary device according to some implementations.

FIG. 15 is a block diagram of an example device 1500. Device 1500 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 1502 (e.g., microprocessors, ASICs, FPGAs, GPUs, CPUs, processing cores, and/or the like), one or more input/output (I/O) devices and sensors 1506, one or more communication interfaces 1508 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 120, and/or the like type interface), one or more programming (e.g., I/O) interfaces 1510, one or more displays 1512, one or more interior and/or exterior facing image sensor systems 1514, a memory 1520, and one or more communication buses 1504 for interconnecting these and various other components.

In some implementations, the one or more communication buses 1504 include circuitry that interconnects and controls communications between system components. In some implementations, the one or more I/O devices and sensors 1506 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 1512 are configured to present a view of a physical environment or a graphical environment to the user. In some implementations, the one or more displays 1512 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 1512 correspond to diffractive, reflective, polarized, holographic, etc. waveguide displays. In one example, the device 10 includes a single display. In another example, the device 10 includes a display for each eye of the user.

In some implementations, the one or more image sensor systems 1514 are configured to obtain image data that corresponds to at least a portion of the physical environment 5. For example, the one or more image sensor systems 1514 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1514 further include illumination sources that emit light, such as a flash. In various implementations, the one or more image sensor systems 1514 further include an on-camera image signal processor (ISP) configured to execute a plurality of processing operations on the image data.

The memory 1520 includes high-speed random-access memory, such as DRAM, SRAM, DDR RAM, or other random-access solid-state memory devices. In some implementations, the memory 1520 includes non-volatile memory, such as one or more magnetic disk storage devices, optical disk storage devices, flash memory devices, or other non-volatile solid-state storage devices. The memory 1520 optionally includes one or more storage devices remotely located from the one or more processing units 1502. The memory 1520 includes a non-transitory computer readable storage medium.

In some implementations, the memory 1520 or the non-transitory computer readable storage medium of the memory 1520 stores an optional operating system 1530 and one or more instruction set(s) 1540. The operating system 1530 includes procedures for handling various basic system services and for performing hardware dependent tasks. In some implementations, the instruction set(s) 1540 include executable software defined by binary information stored in the form of electrical charge. In some implementations, the instruction set(s) 1540 are software that is executable by the one or more processing units 1502 to carry out one or more of the techniques described herein.

The instruction set(s) 1540 include a content instruction set 1542, a physiological tracking instruction set 1544, and an additional user input tracking instruction set 1546. The instruction set(s) 1540 may be embodied a single software executable or multiple software executables.

In some implementations, the content instruction set 1542 is executable by the processing unit(s) 1502 to provide and/or track content for display on a device. The content instruction set 1542 may be configured to monitor and track the content over time (e.g., during an experience such as a XR session) and/or to identify change events that occur within the content. In some implementations, the content instruction set 1542 may be configured to inject change events into content using one or more of the techniques discussed herein or as otherwise may be appropriate. To these ends, in various implementations, the instruction includes instructions and/or logic therefor, and heuristics and metadata therefor.

In some implementations, the physiological tracking (e.g., eye gaze characteristics) instruction set 1544 is executable by the processing unit(s) 1502 to track a user's eye gaze characteristics or other physiological attributes using one or more of the techniques discussed herein or as otherwise may be appropriate. To these ends, in various implementations, the instruction includes instructions and/or logic therefor, and heuristics and metadata therefor.

In some implementations, the additional user input tracking instruction set 1546 is executable by the processing unit(s) 1502 to track motion of a user based on motion data (e.g., avatar motion from camera motion) controlled by the inputs from the HMD tracking (e.g., IMU, base station, etc.) and an input device (e.g., a controller) that includes kinematics/dynamics using one or more of the techniques discussed herein or as otherwise may be appropriate. To these ends, in various implementations, the instruction includes instructions and/or logic therefor, and heuristics and metadata therefor.

Although the instruction set(s) 1540 are shown as residing on a single device, it should be understood that in other implementations, any combination of the elements may be located in separate computing devices. Moreover, FIG. 15 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 16:
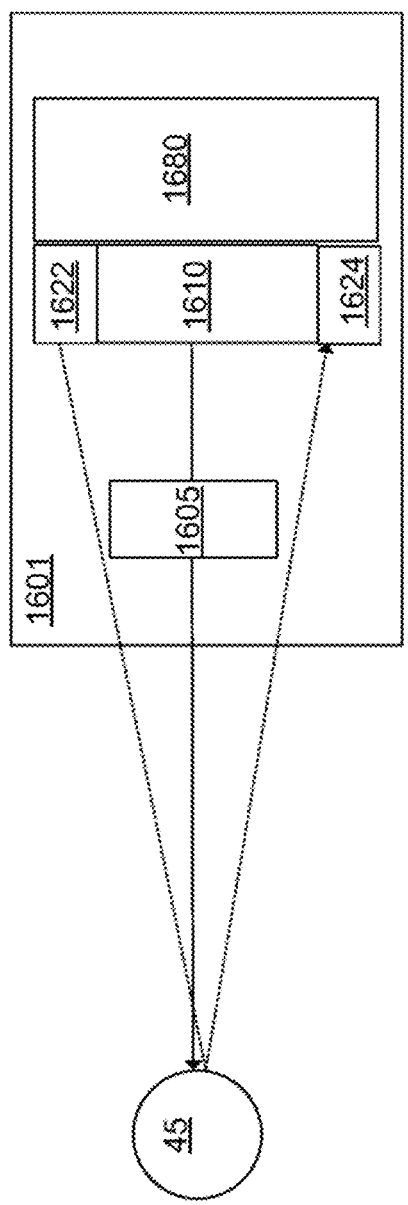
FIG. 16 is a block diagram of an example head-mounted device (HMD) in accordance with some implementations.

FIG. 16 illustrates a block diagram of an exemplary head-mounted device 1600 in accordance with some implementations. The head-mounted device 1600 includes a housing 1601 (or enclosure) that houses various components of the head-mounted device 1600. The housing 1601 includes (or is coupled to) an eye pad (not shown) disposed at a proximal (to the user 25) end of the housing 1601. In various implementations, the eye pad is a plastic or rubber piece that comfortably and snugly keeps the head-mounted device 1600 in the proper position on the face of the user 25 (e.g., surrounding the eye 45 of the user 25).

The housing 1601 houses a display 1610 that displays an image, emitting light towards or onto the eye of a user 25. In various implementations, the display 1610 emits the light through an eyepiece having one or more lenses 1605 that refracts the light emitted by the display 1610, making the display appear to the user 25 to be at a virtual distance farther than the actual distance from the eye to the display 1610. For the user 25 to be able to focus on the display 1610, in various implementations, the virtual distance is at least greater than a minimum focal distance of the eye (e.g., 7 cm). Further, in order to provide a better user experience, in various implementations, the virtual distance is greater than 1 meter.

The housing 1601 also houses a tracking system including one or more light sources 1622, camera 1624, and a controller 1680. The one or more light sources 1622 emit light onto the eye of the user 25 that reflects as a light pattern (e.g., a circle of glints) that can be detected by the camera 1624. Based on the light pattern, the controller 1680 can determine an eye tracking characteristic of the user 25. For example, the controller 1680 can determine a gaze direction and/or a blinking state (eyes open or eyes closed) of the user 25. As another example, the controller 1680 can determine a pupil center, a pupil size, or a point of regard. Thus, in various implementations, the light is emitted by the one or more light sources 1622, reflects off the eye 45 of the user 25, and is detected by the camera 1624. In various implementations, the light from the eye 45 of the user 25 is reflected off a hot mirror or passed through an eyepiece before reaching the camera 1624.

The display 1610 emits light in a first wavelength range and the one or more light sources 1622 emit light in a second wavelength range. Similarly, the camera 1624 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 1610 by looking at it), provide foveated rendering (e.g., present a higher resolution in an area of the display 1610 the user 25 is looking at and a lower resolution elsewhere on the display 1610), or correct distortions (e.g., for images to be provided on the display 1610).

In various implementations, the one or more light sources 1622 emit light towards the eye of the user 25 which reflects in the form of a plurality of glints.

In various implementations, the camera 1624 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 1624 is an event camera including a plurality of light sensors (e.g., a matrix of light sensors) at a plurality of respective locations that, in response to a particular light sensor detecting a change in intensity of light, generates an event message indicating a particular location of the particular light sensor.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
      determining a first zone and a second zone of a display;
      generating images of a three-dimensional (3D) environment;
      identifying image content of each of the images corresponding to the second zone of the display; and
      in response to detecting motion with respect to the 3D environment, reducing at least one of contrast or spatial frequency of the image content of each of the images corresponding to the second zone of the display based on; i) an inner and outer radius associated with the second zone of the display, and ii) a function of eccentricity that is determined as a smooth step function.

2. The method of claim 1, wherein determining the first zone and the second zone of the display comprises:
   tracking a gaze of a user relative to the display; and
   tracking the first zone and the second zone of the display based on the gaze of the user.

3. The method of claim 2, wherein tracking the gaze of the user relative to the display comprises tracking a pixel the user's gaze is currently focused upon.

4. The method of claim 2, wherein tracking the first zone and the second zone of the display based on the gaze comprises identifying a foveated gaze zone (FGZ) of the user as the first zone of the display and identifying an extrafoveal zone of the user as the second zone of the display.

5. The method of claim 1, wherein the display is presented to a user as a first projection for a first eye of the user and a second projection for a second eye of the user.

6. The method of claim 1, wherein reducing contrast or spatial frequency of the image content of each of the images corresponding to the second zone of the display comprises reducing the contrast.

7. The method of claim 1, wherein reducing contrast or spatial frequency of the image content of each of the images corresponding to the second zone of the display comprises reducing the spatial frequency.

8. The method of claim 1, wherein reducing contrast or spatial frequency of the image content of each of the images corresponding to the second zone of the display is based on a function of eccentricity and speed.

9. The method of claim 1, wherein reducing contrast or spatial frequency of the image content of each of the images corresponding to the second zone of the display is based on a function of optic flow.

10. The method of claim 1, wherein the electronic device is a head-mounted device (HMD).

11. The method of claim 1, wherein the 3D environment is based on a user position and/or a user orientation controlled based on a movement of the device, additional input, and/or dynamics/kinematics.

12. The method of claim 1, wherein the 3D environment is a extended reality (XR) experience that is presented to a user.

13. The method of claim 1, wherein the 3D environment is a mixed reality (MR) experience that is presented to a user.

14. The method of claim 1, wherein the 3D environment is a real-world experience that is presented to a user.

15. A device comprising:
   a non-transitory computer-readable storage medium; and
   one or more processors coupled to the non-transitory computer-readable storage medium, wherein the non-transitory computer-readable storage medium comprises program instructions that, when executed on the one or more processors, cause the one or more processors to perform operations comprising:
      determining a first zone and a second zone of a display;
      generating images of a three-dimensional (3D) environment;
      identifying image content of each of the images corresponding to the second zone of the display; and
      in response to detecting motion with respect to the 3D environment, reducing at least one of contrast or spatial frequency of the image content of each of the images corresponding to the second zone of the display based on: i) an inner and outer radius associated with the second zone of the display, and ii) a function of eccentricity that is determined as a smooth step function.

16. The device of claim 15, wherein determining the first zone and the second zone of the display comprises:
   tracking a gaze of a user relative to the display; and
   tracking the first zone and the second zone of the display based on the gaze of the user.

17. The device of claim 16, wherein tracking the gaze of the user relative to the display comprises tracking a pixel the user's gaze is currently focused upon.

18. The device of claim 16, wherein tracking the first zone and the second zone of the display based on the gaze comprises identifying a foveated gaze zone (FGZ) of the user as the first zone of the display and identifying an extrafoveal zone of the user as the second zone of the display.

19. A non-transitory computer-readable storage medium, storing computer-executable program instructions on a computer to perform operations comprising:
   determining a first zone and a second zone of a display;
   generating images of a three-dimensional (3D) environment;
   identifying image content of each of the images corresponding to the second zone of the display; and
   in response to detecting motion with respect to the 3D environment, reducing at least one of contrast or spatial frequency of the image content of each of the images corresponding to the second zone of the display based on: i) an inner and outer radius associated with the second zone of the display, and ii) a function of eccentricity that is determined as a smooth step function.

* * * * *